United States Patent
Rios Ocampo et al.

(10) Patent No.: US 11,650,617 B2
(45) Date of Patent: May 16, 2023

(54) OPTICAL METHODS AND DEVICES

(71) Applicant: Oxford University Innovation Limited, Oxford (GB)

(72) Inventors: Carlos A. Rios Ocampo, Oxford (GB); Nathan Youngblood, Oxford (GB); Zengguang Cheng, Oxford (GB); Harish Bhaskaran, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 180 days.

(21) Appl. No.: 16/764,893

(22) PCT Filed: Jun. 28, 2018

(86) PCT No.: PCT/GB2018/051815
§ 371 (c)(1),
(2) Date: May 18, 2020

(87) PCT Pub. No.: WO2019/102176
PCT Pub. Date: May 31, 2019

(65) Prior Publication Data
US 2020/0341503 A1    Oct. 29, 2020

(30) Foreign Application Priority Data
Nov. 21, 2017 (GB) .................................. 1719346

(51) Int. Cl.
*G06E 1/04* (2006.01)
*G02F 7/00* (2006.01)

(52) U.S. Cl.
CPC ............... *G06E 1/045* (2013.01); *G02F 7/00* (2013.01)

(58) Field of Classification Search
None
See application file for complete search history.

(56) References Cited

U.S. PATENT DOCUMENTS 8,027,587 B1 * 9/2011 Watts ................. G02B 6/12007
359/107
8,639,126 B1 * 1/2014 Nimon ............... H04B 10/2569
398/203

FOREIGN PATENT DOCUMENTS

WO    2017/046590 A1    3/2017

OTHER PUBLICATIONS

Goncharenko et al., "Optical Method of Performing the Operation of Matrix Multiplication", LFNM 2006, Jun. 29-Jul. 1, 2006, Kharkiv, Ukraine, 3 pages (Year: 2006).*
(Continued)

*Primary Examiner* — David W Lambert
(74) *Attorney, Agent, or Firm* — Thomas|Horstemeyer, LLP

(57) ABSTRACT

A method of performing a multiplication operation in the optical domain using a device (100) comprising: an optical waveguide (101), and a modulating element (102) that is optically coupled to the optical waveguide (101), the modulating element (102) modifying a transmission, reflection or absorption characteristic of the waveguide (101) dependant on its state, wherein the state of the modulating element (102) is adjustable by a write signal (103). The method comprises: encoding a first value to the write signal (103), using the write signal (103) to map the first value to a state of the modulating element (102); encoding a second value to a read signal (104); producing an output signal intensity as the transmitted or reflected read signal, wherein the product of the first value and the second value is encoded in the output signal intensity.

20 Claims, 24 Drawing Sheets

(56) References Cited

OTHER PUBLICATIONS

Rios et al., "On-Chip Photonic Memory Elements Employing Phase-Change Materials", 2013, Advanced Materials, WILEY-VCH Verlag GmbH & Co. KGaA, Weinheim, pp. 1372-1377 (Year: 2013).*
International Search Report and Written Opinion for PCT/GB2018/051815, dated Nov. 26, 2018, pp. 1-16.
UK Search Report for GB 1719346.7, dated May 21, 2018, pp. 1-4.
International Preliminary Report on Patentability for PCT/GB2018/051815, dated May 26, 2020, pp. 1-11.
Igor A Goncharenko et al: Optical Method of Performing the Operation of Matrix Multiplication, "Laser and Fiber-Optical Networks Modeling", 8-th International Conference On, IEEE, PI, Jun. 1, 2006 (Jun. 1, 2006), pp. 219-221.
Carlos Rios et al: "On-Chip Photonic Memory Elements Employing Phase-Change Materials", Advanced Materials, vol. 26, No. 9, Dec. 2, 2013 (Dec. 2, 2013), pp. 1372-1377.
Feldmann et al., "All-optical signal processing using phase-change nanophotonics", 19th Intl Conference on Transparent Optical Networks (ICTON 2017), Jul. 2-6, 2017.
Igor A Goncharenko et al, "Optical Method of Performing the Operation of Matrix Multiplication", Laser and Fiber-Optical Networks Modeling, 8-th International Conferen ce on, IEEE, PI, (2006), ISBN 978-1-4244-0233-5, pp. 219-221.
Carlos Rios et al, "On-Chip Photonic Memory Elements Employing Phase-Change Materials", Advanced Materials, DE, (2013), vol. 26, No. 9, doi:10.1002/adma.201304476, ISSN 0935-9648, pp. 1372-1377.
Rios, C. et al., "Integrated all-photonic non-volatile multi-level memory.", Nat. Photonics, (2015), vol. 9, doi: doi:10.1038/nphoton.2015.182, pp. 725-732.
Sun, C. et al., "Single-chip microprocessor that communicates directly using light", Nature, (2015), vol. 528, doi: doi:10.1038/nature16454, pp. 534-538.
Vandoorne, K. et al., "Experimental demonstration of reservoir computing on a silicon photonics chip", Nat. Commun., (2014), vol. 5, doi:doi:10.1038/ncomms4541, pp. 1-6.
Shainline, J. M.; Buckley, S. M.; Mirin, R. P.; Nam, S. W., "Superconducting Optoelectronic Circuits for Neuromorphic Computing", Phys. Rev. Appl., (2017), vol. 7, pp. 1-27.
Shen, Y. et al., "Deep Learning with Coherent Nanophotonic Circuits", Nat. Photonics, (2017), vol. 11, pp. 441-447.
Lee, B. et al., "Silicon Photonic Switch Fabrics in Computer Communications Systems", J. Light. Technol., (2015), vol. 8724, pp. 1-1.
Wuttig, M.; Bhaskaran, H.; Taubner, T., "Phase-change materials for non-volatile photonic applications", Nat. Photonics, (2017), vol. 11, pp. 465-476.
Ikuma, Y. et al., "Small-sized optical gate switch using Ge2Sb2Te5 phase-change material integrated with silicon waveguide", Electron. Lett., (2010), vol. 46, doi:doi:10.1049/EL:20103588, p. 368.
Kato, K.; Kuwahara, M.; Kawashima, H.; Tsuruoka, T.; Tsuda, H., "Current-driven phase-change optical gate switch using indium-tin-oxide heater", Appl. Phys. Express, (2017), vol. 10.
Stegmaier, M.; Rios, C.; Bhaskaran, H.; Wright, C. D.; Pernice, W. H. P., "Nonvolatile All-Optical 1X2 Switch for Chipscale Photonic Networks", Adv. Opt. Mater., (2017), vol. 5, pp. 2-7.
Rude, M. et al., "Optical switching at 1.55 m in silicon racetrack resonators using phase change materials", Appl. Phys. Lett., (2013), vol. 103, doi:doi:10.1063/1.4824714, p. 141119.
Lu, Y. et al., "Mixed-mode operation of hybrid phase-change nanophotonic circuits", Nano Lett., (2017), vol. 17, pp. 150-155.
Pernice, W. H. P.; Bhaskaran, H., "Photonic non-volatile memories using phase change materials", App. Phys. Lett., (2012), vol. 101, doi:doi:10.1063/1.4758996, p. 171101.
Caulfield, H. J.; Dolev, S., "Why future supercomputing requires optics", Nat. Photonics, (2010), vol. 4, pp. 261-263.
Sheridan, P. M., "I. Sparse coding with memristor networks", Nat. Nanotechnol., (2017), vol. 12, pp. 784-789.
Di Ventra, M.; Pershin, Y. V., "The parallel approach", Nat. Phys., (2013), vol. 9, pp. 200-202.
Traversa, F. L.; Di Ventra, M., "Universal Memcomputing Machines", IEEE Trans. Neural Networks Learn. Syst., (2015), vol. 26, doi:doi:10.1109/TNNLS.2015.2391182, pp. 2702-2715.
Wuttig, M.; Yamada, N., "Phase-change materials for rewriteable data storage", Nat. Mater., (2007), vol. 6, pp. 824-832.
Kuramochi, E.; Notomi, M., "Optical memory: Phase-change memory", Nat. Photonics, (2015), vol. 9, pp. 712-714.
Wright, C. D.; Liu, Y.; Kohary, K. I.; Aziz, M. M.; Hicken, R. J., "Arithmetic and biologically-inspired computing using phase-change materials", Adv. Mater., (2011), vol. 23, pp. 3408-3413.
Wright, C. D.; Hosseini, P.; Diosdado, J. A. V., "Beyond von-Neumann Computing with Nanoscale Phase-Change Memory Devices", Adv. Funct. Mater., (2013), vol. 23, doi:doi:10.1002/adfm.201202383, pp. 2248-2254.
Stegmaier, M.; RIos, C.; Bhaskaran, H.; Pernice, W. H. P., "Thermo-optical Effect in Phase-Change Nanophotonics", ACS Photonics, (2016), vol. 3, pp. 828-835.
Waldecker, L. et al., "Time-domain separation of optical properties from structural transitions in resonantly bonded materials", Nat. Mater., (2015), vol. 14, pp. 1-6.
Loke, D. et al., "Breaking the speed limits of phase-change memory", Science, (2012), vol. 336, doi:doi:10.1126/science.1221561, pp. 1566-1569.
Sebastian, A.; Krebs, D.; Le Gallo, M.; Pozidis, H.; Eleftheriou, E., "A collective relaxation model for resistance drift in phase change memory cells", IEEE Int. Reliab. Phys. Symp. Proc., (2015), pp. MY51-MY56.
Ielmini, D.; Lacaita, A. L.; Mantegazza, D., "Recovery and drift dynamics of resistance and threshold voltages in phase-change memories", IEEE Trans. Electron Devices, (2007), vol. 54, doi:doi:10.1109/TED.2006.888752, pp. 308-315.
Karpov, I. V. et al., "Fundamental drift of parameters in chalcogenide phase change memory", J. Appl. Phys., (2007), vol. 102, doi:doi:10.1063/1.2825650, XP012105241.
Fantini, P.; Brazzelli, S.; Cazzini, E.; Mani, A., "Band gap widening with time induced by structural relaxation in amorphous Ge 2Sb 2Te 5 films", Appl. Phys. Lett., (2012), vol. 100, doi:doi:10.1063/1.3674311, XP012155046.
B. J. Eggleton; B. Luther-Davies; K. Richardson, Nat. Photonics, (2011), vol. 5, p. 141.
R. M. Briggs; I. M. Pryce; H. A. Atwater, Opt. Express, (2010), vol. 18, p. 11192.
J. D. Ryckman; K. A. Hallman; R. E. Marvel; R. F. Haglund; S. M. Weiss, Opt. Express, (2013), vol. 21, p. 10753.
G. Kaplan; K. Aydin; J. Scheue, Opt. Mater. Express, (2015), vol. 5, p. 2513.
O. L. Muskens; L. Bergamini; Y. Wang; J. M. Gaskell; N. Zabala; C. De Groot; D. W. Sheel; J. Aizpurua, Light Sci. Appl., (2016), vol. 5, p. e 16173.
Y. Abate; R. E. Marvel; J. I. Ziegler; S. Gamage; M. H. Javani; M. I. Stockman; R. F. Haglund, Sci. Rep., (2015), vol. 5, p. 13997.
R. Bruck; K. Vynck; P. Lalanne; B. Mills; D. J. Thomson; G. Z. Mashanovich; G. T. Reed; O. L. Muskens, Optica, (2016), vol. 3, p. 396.
C. Rios; P. Hosseini; R. A. Taylor; H. Bhaskaran, Adv. Mater., (2016), vol. 28, p. 4720.
P. Hosseini; C. D. Wright; H. Bhaskaran, Nature, (2014), vol. 511, p. 206.
B. Broughton; L. Bandhu; C. Talagrand; S. Garcia-Castillo; M. Yang; H. Bhaskaran; P. Hosseini, SID Symp. Dig. Tech. Pap., (2017), vol. 48, p. 546.
T. Cao; C. Wei; R. E. Simpson; L. Zhang; M. J. Cryan, Sci. Rep., (2014), vol. 4, p. 3955.
B. Gholipour; J. Zhang; K. F. Macdonald; D. W. Hewak; N. I. Zheludev, Adv. Mater., (2013), vol. 25, p. 3050.
Q. Wang; E. T. F. Rogers; B. Gholipour; C.-M. Wang; G. Yuan; J. Teng; N. I. Zheludev, Nat. Photonics, (2015), vol. 10, p. 60.
T. V. P. Bliss; G. L. Collingridge, Nature, (1993), vol. 361, p. 31.

(56) References Cited

OTHER PUBLICATIONS

H. Markram; Y. Wang; M. Tsodyks, Proc. Natl. Acad. Sci., (1998), vol. 95, p. 5323.
Burr, G. W. et al., "Experimental demonstration and tolerancing of a large-scale neural network (165,000 synapses), using phase-change memory as the synaptic weight element", IEEE Trans. Electron Devices, (2015), vol. 62, doi:doi:10.1109/TED.2015.2439635, pp. 3498-3507.
N. Yamada; E. Ohno; K. Nishiuchi; N. Akahira; M. Takao, J. Appl. Phys., (1991), vol. 69, p. 2849.
S. J. Martin; P. D. Grimwood; R. G. M. Morris, Annu. Rev. Neurosci., (2000), vol. 23, p. 649.
M. A. Lynch, Physiol. Rev., (2004), vol. 84, p. 87.
T. Natschlager; W. Maass; A. Zador, Network, (2001), vol. 12, p. 75.
R. Gutig; H. Sompolinsky, Nat. Neurosci., (2006), vol. 9, p. 420.
T. Tuma; A. Pantazi; M. Le Gallo; A. Sebastian; E. Eleftheriou, Nat. Nanotechnol., (2016), vol. 11, p. 693.
T. Tuma; M. Le Gallo; A. Sebastian; E. Eleftheriou, IEEE Electron Device Lett., (2016), vol. 37, p. 1238.
R. Berdan; E. Vasilaki; A. Khiat; G. Indiveri; A. Serb; T. Prodromakis, Sci. Rep., (2016), vol. 6, p. 18639.
S.-H. Lee; Y. Jung; R. Agarwal, Nat. Nanotechnol., (2007), vol. 2, p. 626.
A. Sebastian; M. Le Gallo; D. Krebs, Nat. Commun., (2014), vol. 5.
M. Salinga; E. Carria; A. Kaldenbach; M. Bornhofft; J. Benke; J. Mayer; M. Wuttig, Nat. Commun., (2013), vol. 4.
I. Friedrich; V. Weidenhof; W. Njoroge; P. Franz; M. Wuttig, J. Appl. Phys., (2000), vol. 87, No. 12, p. 4130.
S. E. Fahlman; C. Lebiere, Adv. Neural Inf. Process. Syst., (1990), vol. 2, pp. 524-532.

\* cited by examiner

OPTICAL METHODS AND DEVICES

CROSS-REFERENCE TO RELATED APPLICATIONS

This application is the National Stage of International Application No. PCT/GB2018/051815, filed Jun. 28, 2018, which claims priority to GB 1719346.7, filed Nov. 21, 2017, which are entirely incorporated herein by reference.

The present invention relates to: a method and apparatus for performing multiplication; a method and apparatus for digital to analogue conversion; a method and apparatus for adjusting a state of a phase change material; and a method and apparatus for achieving volatile optical memory elements.

BACKGROUND

Integrated photonics offers attractive solutions for using light to carry out computational tasks on a chip and phase-change materials are emerging as functional materials of choice on photonic platforms. On-chip non-volatile memories that can be written, erased, and accessed optically are rapidly bridging a gap towards all-photonic chip-scale information processing.

In present computing systems, storage and processing of data occur in different physical locations—the memory and the processor. The transfer of information between the memory and processor is a well-known problem that limits the speed of computers. It has been suggested that scalar multiplication and bulk-bitwise operations may be performed in memelements—electronic circuit elements that perform both information processing and storage. Such memcomputing machines (comprising memelements) may be able to solve certain nondeterministic polynomial (NP) problems in polynomial (P) time by exploiting attributes such as inherent parallelism, functional polymorphism and information overhead.

Photonic devices have potential advantages over electronic implementations—they can provide an even faster solution that allows for rapid multiplexing using different wavelengths on a chip. Photonic memories have been disclosed in recent years, for example in WO2017/046590, the disclosure of which is hereby incorporated by reference. Although considerable progress has been made, there is still room for improvement in a number of areas.

SUMMARY

Each embodiment and aspect of the invention may be implemented using, or comprise, a device which comprises: an optical waveguide, and a modulating element that is optically coupled to the optical waveguide, the modulating element modifying a transmission, reflection or absorption characteristic of the waveguide dependant on its state, wherein the state of the modulating element is adjustable either by an optical signal carried by the waveguide or by an electrical signal applied to the waveguide or to a resistive element located proximate the modulating element.

The modulating element may comprise a phase change material. The phase change material may be a superlattice material. The phase change material may comprise or consist of a compound or alloy of a combination of elements selected from GeSbTe, $VO_x$, $NbO_x$, GeTe, GeSb, GaSb, AgInSbTe, InSb, InSbTe, InSe, SbTe, TeGeSbS, AgSbSe, SbSe, GeSbMnSn, AgSbTe, AuSbTe and AlSb. The phase change material may comprise a mixture of compounds selected from the list. A core material of the waveguide may have an optical bandgap of at least 1 eV. A core material of the waveguide may be selected from: silicon, silicon nitride, gallium nitride, gallium arsenide, aluminium nitride, magnesium oxide and diamond (polycrystalline or single crystal). The modulating element may have a thickness of less than 40 nm or 20 nm.

According to a first aspect of the invention, there is provided a method of performing a multiplication operation in the optical domain using a device comprising:
  an optical waveguide, and a modulating element that is optically coupled to the optical waveguide, the modulating element modifying a transmission, reflection or absorption characteristic of the waveguide dependant on its state, wherein the state of the modulating element is adjustable by a write signal;
  wherein the method comprises the following steps:
    encoding a first value to the write signal,
    using the write signal to map the first value to a state of the modulating element;
    encoding a second value to a read signal;
    producing an output signal intensity as the transmitted or reflected read signal, wherein the product of the first value and the second value is encoded in the output signal intensity.

The write signal may be an optical signal carried by the waveguide. Using the write signal to map the first value to a state of the modulating element may comprise transmitting the write signal through the waveguide.

The write signal may be an electrical signal. The waveguide may be doped and the electrical signal may be applied to the doped waveguide. The electrical signal may be applied to a resistive element proximate the modulating element. The electrical signal may be a current pulse.

The electrical signal may cause a current to flow through the waveguide or resistive element resulting in Joule heating and transfer of heat energy from the waveguide or resistive element to the modulating element, thereby adjusting the state of the modulating element.

According to a second aspect of the invention, there is provided a method of performing a multiplication operation in the optical domain using a device comprising:
  an optical waveguide, and a modulating element that is optically coupled to the optical waveguide, the modulating element modifying a transmission, reflection or absorption characteristic of the waveguide dependant on its state, wherein the state of the modulating element is adjustable by an optical signal carried by the waveguide;
  wherein the method comprises the following steps:
    encoding a first value to a write signal,
    using the write signal to map the first value to a state of the modulating element by transmitting the write signal through the waveguide;
    encoding a second value to a read signal;
    producing an output signal intensity as the transmitted or reflected read signal, wherein the product of the first value and the second value is encoded in the output signal intensity.

The following optional features apply to both the first and second aspects of the invention.

Determining the result may comprise applying an offset correction to the output intensity.

The offset correction may correspond with intensity of the output signal.

Determining the result may comprise applying a scaling correction to the output intensity.

The first value and the second value have at least three different possible levels.

The write pulse may map the first value to a degree of amorphization of the modulating element.

The modulating element may be placed in a baseline crystalline condition prior to using the write signal.

Placing the modulating element in a baseline crystalline condition may comprise using a two-step reset pulse, the first step having a higher power and shorter duration than the second step. The reset pulse may be according to the sixth aspect, described below. The two step pulse is not restricted to a first step that has a fixed power and a second step that has a fixed power, and may take other forms. For example, a square first step may be followed by a triangular wave second step, or a two-step reset pulse with a continuously varying power may be used, in which the first step comprises a high power portion and the second step comprises a lower power portion.

There may be a linear scaling between first value and the product and between the second value and the product.

The output pulse intensity may be detected as the proportion of the read pulse that is transmitted.

The write signal may be an optical write pulse.

The read signal may be an optical read pulse.

The method may comprise determining a vector or matrix multiplication by performing more than one multiplication operation, wherein the output signal is produced by combining transmitted or reflected signals from more than one waveguide.

The method may comprise using a device comprising more than one waveguide, each of the more than one waveguide comprising a corresponding modulating element.

The device may further comprise at least one optical combiner, each combiner configured to combine the output signal produced by at least one waveguide.

The write signal may be a first write signal that maps the first value to a state of a first region of the modulating element, and the method may further comprise: encoding a third value to a second write signal, and using the second write signal to map the third value to a state of a second region of the modulating element, wherein the output signal intensity encodes the product of the first, second and third values and/or the sum of the first value multiplied by the second value and the first value multiplied by the third value.

The method may comprise encrypting or decrypting information.

The first and second write signal may be propagated in different directions.

The device may comprise a first waveguide defining a read signal propagation direction, and at least one further waveguide for carrying write signals substantially transverse to the direction of read signal propagation.

The optical waveguide may be a first optical waveguide, and the device may further comprise a second waveguide, which may be transverse to the first waveguide (or at any non-zero angle to the first waveguide) in the region of the modulating element, wherein the modulating element is optically coupled to both the first waveguide and the second waveguide.

According to a third aspect, there is provided a device for performing a multiplication operation in the optical domain comprising:
an optical waveguide;
a modulating element that is optically coupled to the optical waveguide, the modulating element modifying a transmission, reflection or absorption characteristic of the waveguide dependant on its state, wherein the state of the modulating element is adjustable by a write signal;
a light source configured to transmit optical signals through the optical waveguide;
a detector configured to detect an intensity of light from the waveguide;
a controller, configured to:
encode a first value to the write signal;
encode a second scalar value to a read signal transmitted by the light source;
determine an output pulse intensity based on a signal from the detector;
determine the result of multiplication of the first and second values based on the output intensity.

The state of the modulating element may be adjustable by an optical signal carried by the waveguide. The controller may be configured to encode a first value to a write signal transmitted by the light source.

The device may comprise an electrical signal generator. The state of the modulating element may be adjustable by an electrical signal generated by the electrical signal generator, the electrical signal being said write signal.

The waveguide may be doped and the electrical signal may be arranged to be applied to the waveguide.

The device may further comprise a resistive element proximate the modulating element. The electrical signal may be arranged to be applied to the resistive element.

The controller may be configured to encode a first value to the electrical signal produced by the electrical signal generator.

The electrical signal may be arranged to cause a current to flow through the waveguide or resistive element resulting in Joule heating and transfer of heat energy from the waveguide or resistive element to the modulating element, thereby adjusting the state of the modulating element. The electrical signal may be a current pulse.

According to a fourth aspect, there is provided a device for performing a multiplication operation in the optical domain comprising:
an optical waveguide;
a modulating element that is optically coupled to the optical waveguide, the modulating element modifying a transmission, reflection or absorption characteristic of the waveguide dependant on its state, wherein the state of the modulating element is adjustable by an optical signal carried by the waveguide;
a light source configured to transmit optical signals through the optical waveguide;
a detector configured to detect an intensity of light from the waveguide;
a controller, configured to:
encode a first value to a write signal transmitted by the light source;
encode a second scalar value to a read signal transmitted by the light source;
determine an output pulse intensity based on a signal from the detector;
determine the result of multiplication of the first and second values based on the output intensity.

According to a fifth aspect, there is provided a device comprising a first optical waveguide defining a read signal propagation direction, and a modulating element that is optically coupled to the first optical waveguide, the modulating element modifying a transmission, reflection or absorption characteristic of the waveguide dependant on its state, wherein the state of the modulating element is adjustable by at least one write optical signal carried by a respective at least one write optical waveguide, each write waveguide introducing the respective write signal to the modulating element at a different direction to the direction of the read signal propagation (e.g. transverse to the direction of the read signal propagation).

According to a sixth aspect, there is provided a device comprising a first optical waveguide and a second optical waveguide and a modulating element, wherein the modulating element is optically coupled to both the first and second waveguide, and the first waveguide is configured to propagate light through the modulating element in a first direction, and the second waveguide is configured to propagate light through the modulating element in a second direction that is different to the first direction (e.g. transverse to the direction of the read signal propagation).

The device according to any of the third to sixth aspects may be configured to perform the method of the first aspect.

According to a seventh aspect, there is provided a method of weighting signal optical pulses using a device comprising:
   an optical waveguide, and a modulating element that is optically coupled to the optical waveguide, the modulating element modifying a transmission, reflection or absorption characteristic of the waveguide dependant on its state, wherein the state of the modulating element is adjustable by an optical signal carried by the waveguide;
   wherein the method comprises:
      transmitting a timing optical pulse through the waveguide; and
      subsequently transmitting the signal optical pulses through the waveguide, wherein each signal optical pulse causes an amount of adjustment of the state of the modulating element that is weighted by the time delay between the timing optical signal pulse and the respective signal optical pulse;
      producing an output signal intensity as a transmitted or reflected read signal, the output signal encoding the amount of adjustment of the modulating element.

The method may comprise performing a digital to analogue conversion, wherein the signal optical pulses are the digital input signal, and the output signal is the analogue output signal.

The time delay between the timing optical pulse and the first signal optical pulse may be less than a thermal time constant of the modulating element.

The time delay between the timing optical pulse and the first signal optical pulse may be less than 25 ns.

The timing pulse and each signal optical pulse may comprise the same duration and the same pulse energy.

The waveguide may be in a baseline crystalline state before transmission of the timing optical pulse.

Each signal optical pulse may increase the amount of amorphous material present in the modulating element.

The weighting of the signal optical pulses may be binary, such that each successive signal optical pulse causes approximately half as much amorphization as the preceding signal optical pulse.

According to an eighth aspect, there is provided a device for performing optical digital to analogue conversion, comprising:
   an optical waveguide;
   a modulating element that is optically coupled to the optical waveguide, the modulating element modifying a transmission, reflection or absorption characteristic of the waveguide dependant on its state, wherein the state of the modulating element is adjustable by an optical signal carried by the waveguide;
   a light source configured to transmit pulses of light through the optical waveguide;
   a controller, configured to use the light source to:
      transmit a timing optical pulse through the waveguide, and
      subsequently transmit a signal optical pulse through the waveguide,
      with a time delay between a leading edge of the signal optical pulse and a leading edge of the timing optical pulse is less than a thermal time constant of the modulating element.

The device of the eighth aspect may be configured to perform the method of the seventh aspect.

According to a ninth aspect, there is provided a method of controlling volatility in an optical memory element, wherein the optical memory element comprises:
   an optical waveguide, a modulating element that is optically coupled to the optical waveguide, the modulating element modifying a transmission, reflection or absorption characteristic of the waveguide dependant on its state, wherein the state of the modulating element is adjustable by a write signal;
   wherein the method comprises:
      modifying the state of the modulating element with the write signal; and
      controlling the volatility of the modulating element using a read signal transmitted through the waveguide, the read signal having a power that is high enough to cause recrystallization of the modulating element in a steady state.

The write signal may be an optical signal carried by the waveguide. The state of the modulating element may be modified with an optical write signal carried by the waveguide.

The write signal may be an electrical signal. The state of the modulating element may be modified by applying the electrical signal to the waveguide or to a resistive element proximate the waveguide and the modulating element.

According to a tenth aspect, there is provided a method of controlling volatility in an optical memory element, wherein the optical memory element comprises:
   an optical waveguide, a modulating element that is optically coupled to the optical waveguide, the modulating element modifying a transmission, reflection or absorption characteristic of the waveguide dependant on its state, wherein the state of the modulating element is adjustable by an optical signal carried by the waveguide;
   wherein the method comprises:
      modifying the state of the modulating element with an optical write signal carried by the waveguide;
      controlling the volatility of the modulating element using a read signal transmitted through the waveguide, the read signal having a power that is high enough to cause recrystallization of the modulating element in a steady state.

The following optional features apply to both the ninth and tenth aspects of the invention.

The read signal may have a power that is sufficient to heat the modulating element to at least the crystallization temperature in the steady state.

The read signal may be substantially continuous.

The power of the read signal may be at least 1 mW, or may be at least 0.1 mW.

The method may comprise determining a degree of correlation between a first optical signal and a second optical signal by transmitting the first optical signal and the second optical signal through the waveguide at the same time with the read signal, wherein the degree of correlation is indicated by the intensity of an output signal produced by transmission or reflection of the read signal by the waveguide.

According to an eleventh aspect, there is provided a method of using a plurality of memory cells to simulate a neurological system, wherein at least some of the memory cells are operated in accordance with the ninth or tenth aspect.

According to a twelfth aspect, there is provided a memory system comprising:
an optical waveguide;
a modulating element that is optically coupled to the optical waveguide, the modulating element modifying a transmission, reflection or absorption characteristic of the waveguide dependant on its state, wherein the state of the modulating element is adjustable by a write signal;
at least one light source, the at least one light source configured to transmit optical signals through the optical waveguide;
a controller, configured to:
apply the write signal to adjust the state of the modulating element;
transmit a read signal from the at least one light source with a power sufficient to cause recrystallization of the modulating element in the steady state.

The write signal may be an optical signal carried by the waveguide. The controller may be configured to transmit a write optical signal from the at least one light source to adjust the state of the modulating element.

The write signal may be an electrical signal. The controller may be configured to apply the electrical signal to the waveguide or to a resistive element proximate the waveguide and the modulating element in order to adjust the state of the modulating element.

According to a thirteenth aspect, there is provided a memory system comprising: an optical waveguide;
a modulating element that is optically coupled to the optical waveguide, the modulating element modifying a transmission, reflection or absorption characteristic of the waveguide dependant on its state, wherein the state of the modulating element is adjustable by an optical signal carried by the waveguide;
at least one light source, the at least one light source configured to transmit optical signals through the optical waveguide;
a controller, configured to:
transmit a write optical signal from the at least one light source to adjust the state of the modulating element;
transmit a read signal from the at least one light source with a power sufficient to cause recrystallization of the modulating element in the steady state.

The following optional features apply to both the twelfth and thirteenth aspects of the invention.

The memory system may comprise a detector, configured to detect an intensity of light from the waveguide.

The memory system may comprise a plurality of modulating elements.

The memory system may comprise a plurality of waveguides, at least some of which comprise a modulating element.

The memory system may be configured to perform the method of the seventh or eighth aspect.

According to fourteenth aspect, there is provided a method of adjusting the state of a phase change material in a device comprising:
an optical waveguide;
a modulating element that is optically coupled to the optical waveguide, the modulating element modifying a transmission, reflection or absorption characteristic of the waveguide dependant on its state, wherein the state of the modulating element is adjustable by an optical signal carried by the waveguide;
the method comprising;
using a composite reset optical pulse to increase the crystalline fraction of the modulating element, the composite reset optical pulse comprising an amorphization pulse and a crystallization pulse, the amorphization pulse having a higher power and a shorter duration than the amorphization pulse.

The amorphization pulse may have a power at least twice that of the crystallization pulse.

The crystallization pulse may have a duration at least twice that of the amorphization pulse The composite reset pulse may be a stepped pulse.

Any time delay between a trailing edge of the amorphization pulse and a leading edge of the crystallization pulse may be less than a thermal time constant of the modulating element.

The amorphization pulse may have a power of at least 5 mW or at least 10 mW prior to the modulating element.

The crystallization pulse may have a power of less than 8 mW prior to the modulating element.

The total switching energy of the composite reset optical pulse may be less than 3 nJ, or 2 nJ or 1 nJ or 800 pJ or 600 pJ.

The duration of the composite reset optical pulse may be less than 1 µs, or 500 ns or 400 ns or 300 ns or 200 ns or 150 ns.

The composite reset signal may return the modulating element to a baseline state, which may be a fully crystalline state.

The power level of the crystallization pulse may be selected based on a desired degree of recrystallization of the modulating element.

According to a fifteenth aspect, there is provided a device, comprising:
an optical waveguide;
a modulating element that is optically coupled to the optical waveguide, the modulating element modifying a transmission, reflection or absorption characteristic of the waveguide dependant on its state, wherein the state of the modulating element is adjustable by an optical signal carried by the waveguide;
a light source configured to transmit pulses of light through the optical waveguide;
a controller, configured to use the light source to:
transmit a composite reset optical pulse to increase the crystalline fraction of the modulating element, the composite reset optical pulse comprising an amorphization pulse and a crystallization pulse, the amorphization pulse having a higher power and a shorter duration than the crystallization pulse.

The device may be configured to perform the method according to the fourteenth aspect.

According to a sixteenth aspect, there is provided a device for performing a matrix multiplication operation in the optical domain, the device comprising:
a first plurality of optical waveguides defining a plurality of rows;

a second plurality of optical waveguides defining a plurality of columns, wherein the first and second pluralities of optical waveguides are overlaid to define a number of crossings;

a plurality of waveguide coupling elements, each positioned adjacent to a respective crossing of one of the first plurality of optical waveguides with one of the second plurality of optical waveguides, each waveguide coupling element having a respective modulating element which is optically coupled to the waveguide coupling element, wherein each waveguide coupling element is arranged to couple light from an adjacent one of the first plurality of optical waveguides and to couple light into an adjacent one of the second plurality of optical waveguides, wherein a transmission characteristic of the waveguide coupling element is responsive to the state of the modulating element coupled thereto.

The device may comprise one or more detectors arranged at the outputs of the second plurality of optical waveguides.

The first plurality of optical waveguides may be transverse to the second plurality of optical waveguides.

Each of the first plurality of optical waveguides may cross each of the second plurality of waveguides.

The coupling waveguides adjacent to each of the first plurality of waveguides may be configured to receive an equal proportion of a signal carried by the respective waveguide. The coupling waveguides adjacent to each of the second plurality of waveguides may be configured to receive an equal proportion of a signal carried by the respective waveguide.

The device may comprise a plurality of resistive elements, each located proximate a respective modulating element. The device may comprise an electrical signal generator. The electrical signal generator may be arranged to provide electrical current pulses to the resistive elements. The modulating elements may each comprise a phase change material. The electrical current pulse may adjust the state of the phase change material as a result of heat generated in the resistive element.

The waveguide coupling elements may be doped. The electrical signal generator may be arranged to provide electrical current pulses to the doped waveguide coupling elements to adjust the state of the phase change material as a result of heat generated in the doped waveguide coupling element.

The device may be arranged to receive an input vector encoded in the intensities of a plurality of input optical pulses, wherein each one of the first plurality of optical waveguides receives a respective input optical pulse. The input optical pulses may have different optical wavelengths. The input optical pulses may all have the same optical wavelength.

The states of the modulating elements may encode matrix elements of a matrix multiplying the input vector, wherein each modulating element encodes one element of the matrix multiplying the input vector.

The device may be arranged to determine the output vector resulting from the multiplication of the input vector by the matrix. The components of the output vector may be encoded in output optical intensities of the second plurality of optical waveguides.

The features (including optional features) of any aspect may be combined with those of any other aspect, as appropriate.

DETAILED DESCRIPTION

Example embodiments will now be described, purely by way of example, with reference to the accompanying drawings, in which:

FIG. 1 is schematic of a GST-based photonic memory cell in which optical signals are used to both write and read a state of a modulating element coupled to a waveguide;

FIG. 2 schematically illustrates the multiplication of two scalar numbers a and b to produce product c according to an embodiment;

Figure 43:
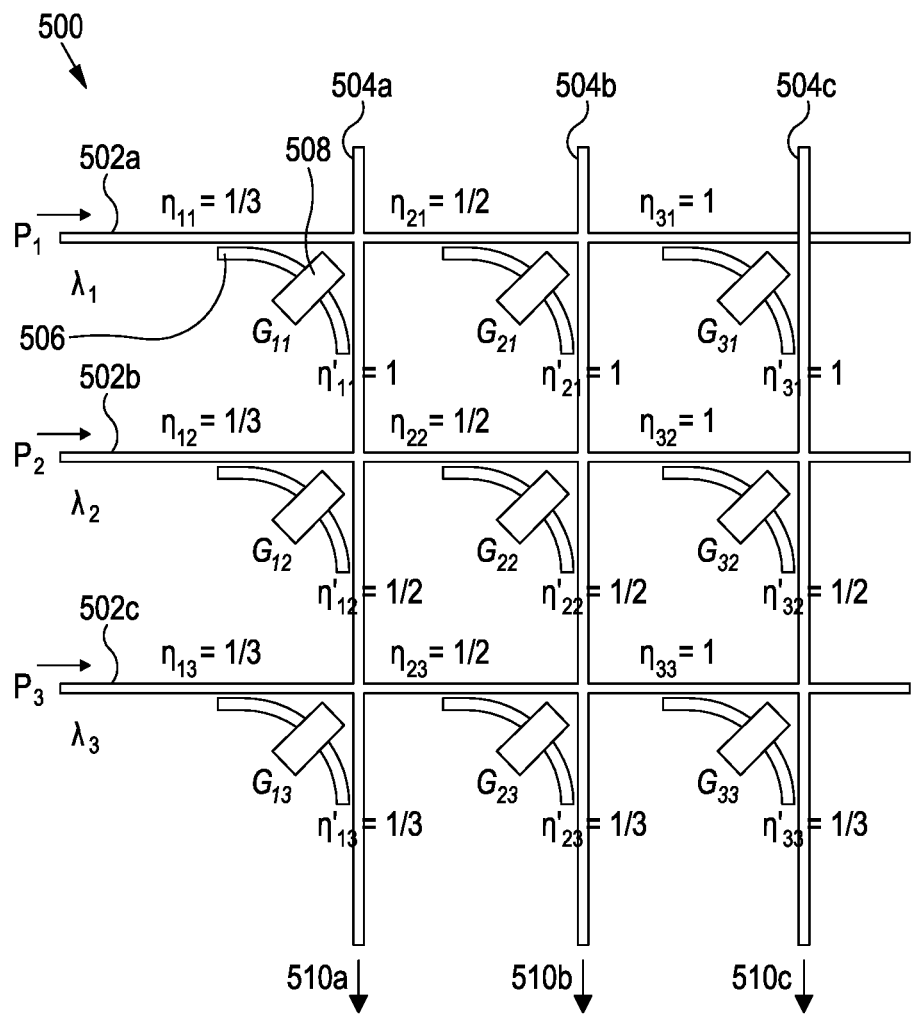
Figure 44:
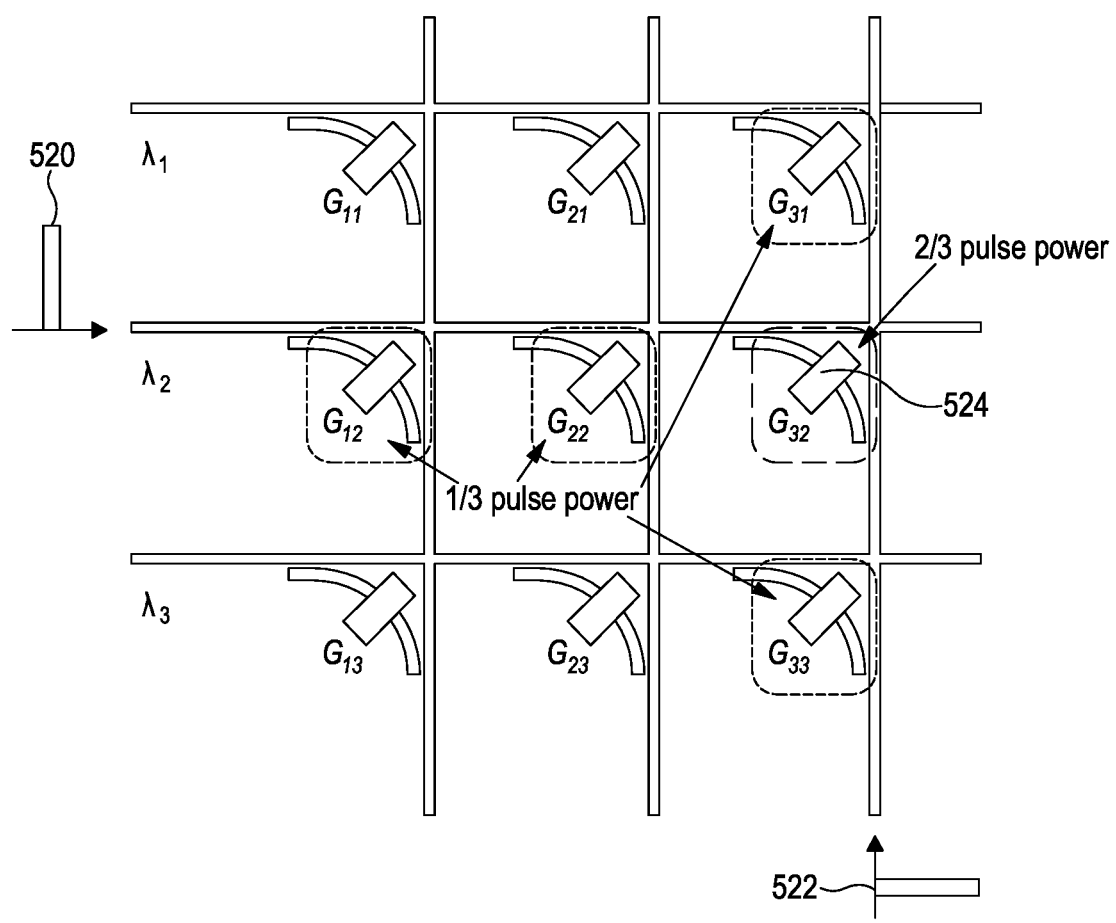
Figure 45:
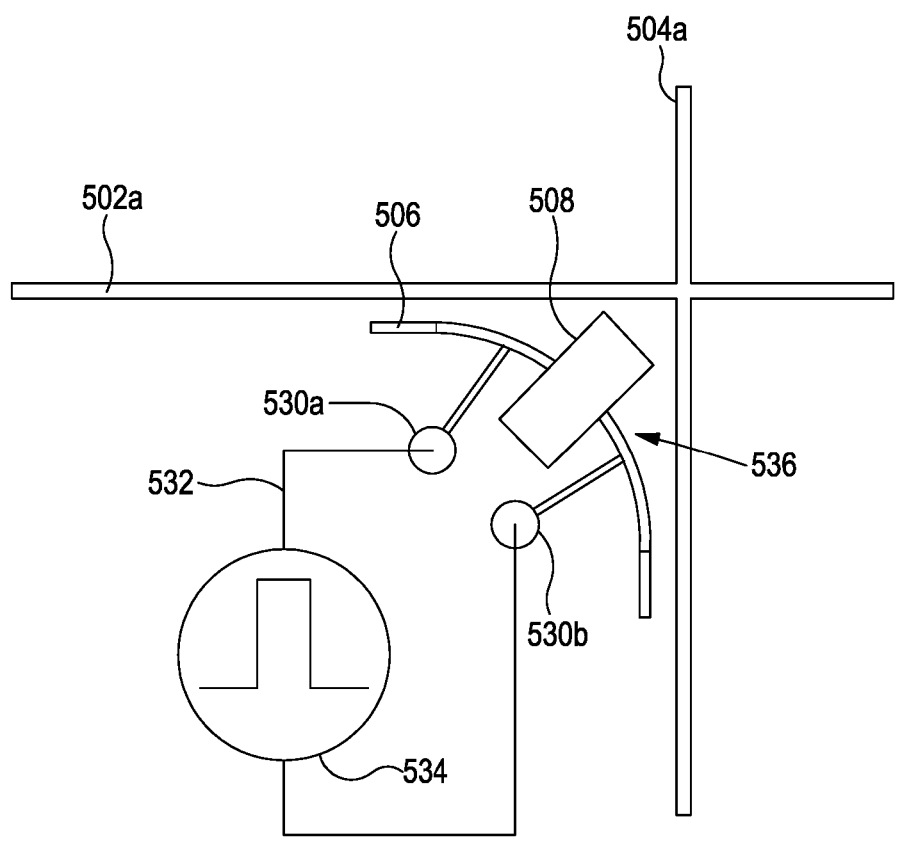

FIG. 43 schematically illustrates a device for determining the multiplication of a vector by a matrix;

FIG. 44 schematically illustrates a way of optically adjusting modulating elements of the device of FIG. 43; and FIG. 45 schematically illustrates a portion of the device of FIGS. 43 and 44 having doped waveguide coupling elements used as heaters.

Figure 1:
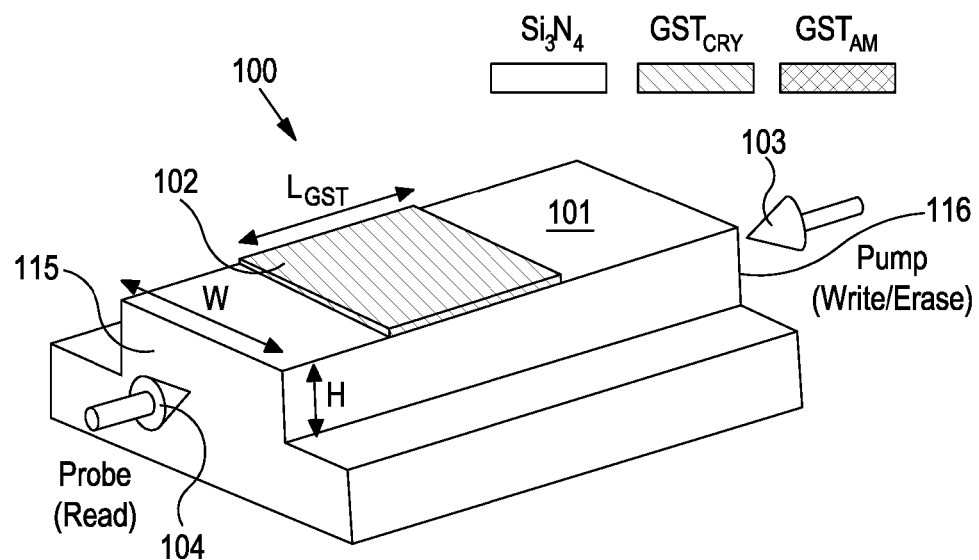

FIG. 1 shows a device 100 comprising a waveguide 101 and a modulating element 102. The modulating element 102 is optically (near field) coupled to the waveguide 101, so that a light signal carried by the waveguide 101 interacts with the modulating element 102.

The modulating element 102 may comprise any material that is switchable between different states, each different state corresponding with different optical properties of the modulating element. Preferably, the modulating element 102 comprises a phase change material such as GST. The modulating element 102 may comprise a further encapsulation layer, which may comprise ITO, for example to protect the PCM layer from oxidation.

The waveguide 101 may be, but is not limited to, a planar waveguide, for example a rib waveguide. The waveguide 101 comprises a core material that is capable of carrying a write optical signal (or pulse) 103 to the modulating element 102 so as to adjust the state of the modulating element 102. In general, suitable materials for the waveguide core may have a bandgap of at least 1 eV.

One example of a suitable material for the core of the waveguide 101 is silicon nitride. Alternative materials include silicon, gallium nitride, gallium arsenide, diamond (monocrystalline or polycrystalline) and magnesium oxide, but any material with a bandgap greater than 1 eV may be suitable. The waveguide core may comprise an insulating material or a semiconductor.

An air cladding may be used around the waveguide core 101. In alternative embodiments, other materials may be used. Solid phase cladding materials may be used to reduce a thermal time constant of the modulating element 102.

The transmission characteristics of the optical waveguide 101 may be inferred by transmitting a read signal (or optical pulse) 104 through the waveguide 101, and monitoring the amount of the read signal that is transmitted through (or reflected from) the waveguide 101.

The state of the modulating element 102 is adjustable by the write optical pulse 103 carried by the waveguide 101. The write pulse 103 may be input to the waveguide at either of the first or second port 115, 116. The evanescent coupling of the write pulse 103 results in the absorption of optical power by the modulating element 102. The consequent heating of the modulating element 102 by the write pulse 103 may change the state of the modulating element 102. Since the modulating element 102 is optically coupled to the waveguide 101, changes to the optical properties of the modulating element 102 result in changes to the transmission, reflection or absorption characteristics of the optical waveguide 101.

Information in the write pulse may thereby be mapped to a state of the modulating element 102, which in turn defines a transmission characteristic of the waveguide 101.

In the example of FIG. 1, the write pulses have a wavelength $\lambda=1590$ nm and the read pulses have a wavelength $\lambda=1598$ nm. The length of the modulating element (along the direction of propagation of light through the waveguide 101) is 1 μm or 2 μm. The width of the waveguide is 1.3 μm, and the height of the waveguide h=165 nm (etched down from a 330 nm thick $Si_3N_4$ layer). Other geometries of waveguide and modulating element may also be used—this is merely an example.

Alternatively, or in addition to the use of optical write pulses as described above, the state of the modulating element 102 may be adjustable by an electrical write signal which is applied to the waveguide 101 or to a separate resistive element proximate the modulating element. For example, the waveguide core (e.g. silicon) may be doped. In this manner the doped waveguide may act as a heater element by applying a write signal in the form of an electrical current pulse through the doped waveguide. The current pulse results in Joule/resistive heating in the doped waveguide. The heat generated in the doped waveguide will also result in heating of the adjacent modulating element which can be used to change the state of the modulating element in a similar manner to that described above with reference to the optical write pulse. As a further alternative, a separate resistive element may be used as a heater element, rather than or in addition to a doped waveguide. For example, a resistive element may be formed in a metal layer above the modulating element. The current pulse may be generated by an electrical signal generator which is controlled by a controller. The heat generated in the resistive element or doped waveguide may be used to amorphize or crystallize the phase change material of the modulating element by a pre-determined amount, e.g. based on a prior calibration of how the electrical pulse energy delivered to the waveguide/resistive element affects the state of the modulating element.

In more detail (which is not intended to limit this disclosure), one way to fabricate the device 100 is to start with a 330 nm $Si_3N_4$ on a 3.3 µm $SiO_2$ layer, deposited on a silicon wafer. A lithography tool may be used to write the photonic circuitry, followed by a reflow process (e.g. 90 s at 100° C.). A JEOL JBX-5500ZD 50 kV Electron-beam was used for these prototype devices, but a stepper or contact aligner may also be used. MaN-2403 negative resist was used to make these examples, but other resists may be used. After resist development and reflow, reactive ion etching (RIE) in $CHF_3$/$Ar/O_2$ was carried out to etch 165 nm of the $Si_3N_4$ and thus obtain the bare photonic device. A second lithographic writing step using poly(methyl methacrylate) (PMMA), followed by a lift-off process, was used to pattern the phase-change materials. A stack of 10 nm of GST with a 10 nm ITO capping (to avoid oxidation) was deposited in an argon environment using an RF sputtering system (Nordiko). Before the measurements the GST was crystallized on a hotplate following a 5 minute anneal at 250° C.

Using GST as an example, the modulating element may be crystallised by annealing from the amorphous state at temperatures over 150° C., or amorphized from the crystalline state by rapid quenching from a temperature over ~600° C. Most phase-change materials (including GST) possess a non-negligible imaginary refractive index in the visible and near-IR wavelength range, light is attenuated in different amounts depending on the phase of the material, which give rise to differentiable transmitted signals, so encoding information therein.

Figure 3:
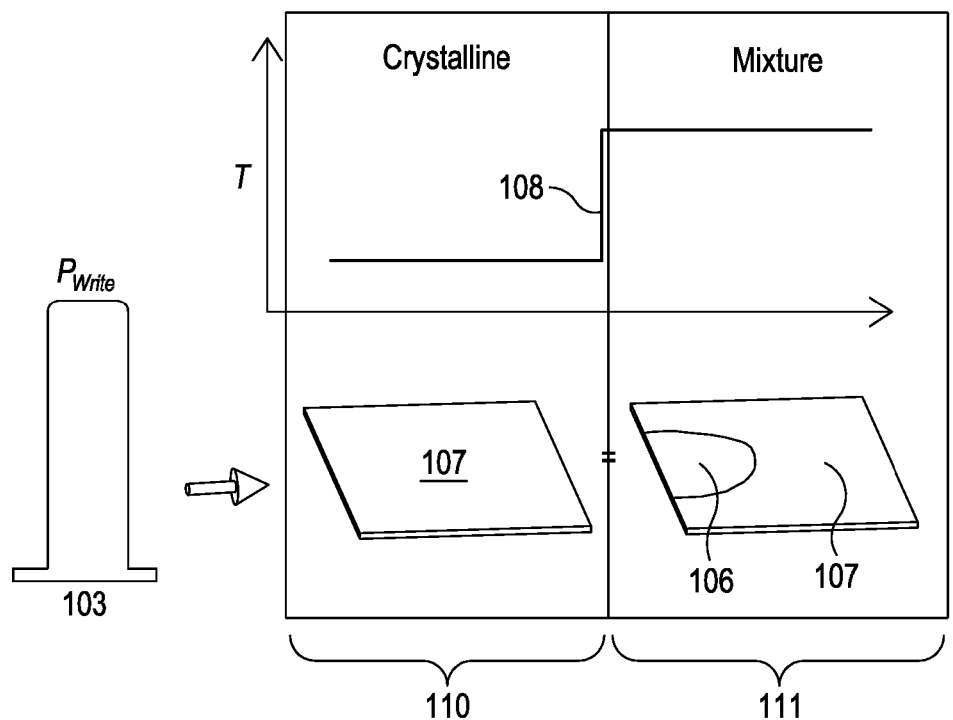
FIG. 3 illustrates adjusting the state of a phase change material modulating element using a write pulse, and the consequent change in transmission of the waveguide.

As shown in FIG. 3, the initial state 110 of the modulating element 102 may be crystalline (e.g. after a write pulse 103 that resets the modulating element 102 to this state). The subsequent write pulse 103 may be arranged to amorphize the modulating element 102 to a state 111 with a sub-region 106 that is amorphous. The size of the amorphous sub-region will depend on the power of the write pulse 103.

We can define the write pulse energy $P_{Write} > E_{Th} > E_{Pin}$, where $E_{Th}$ is the threshold energy to partially amorphize the phase-change material. The greater the proportion of amorphous material in the modulating element 102, the more transmissive the waveguide 101 becomes.

In the experimental examples given herein, a counter-propagating write and read pulse measurement configuration was adopted (as illustrated in FIG. 1). Write pulses were used to control the phase-configuration of GST, while a continuous-wave (CW) read optical signal was used to read-out the transmission state of the modulating element 102. The read signal 104 employed a low enough energy/power so that the state of the modulating element 102 was not modified by the read signal 104. Multiple and non-volatile levels of transmission were reached as a result of the mixture between amorphous and crystalline GST by controlling the power of the pump pulse to write (amorphize) up to any level of higher transmission. To erase (recrystallize), two approaches may be used: i) a train of decreasing-energy pulses; or ii) a single multi-step pulse (e.g. two-step). Any level (i.e. from fully crystalline to fully amorphous) can be reached starting from any other and the number of levels is limited by the geometry of the GST cell and the available signal-to-noise ratio of the detection arrangement.

Figure 2:
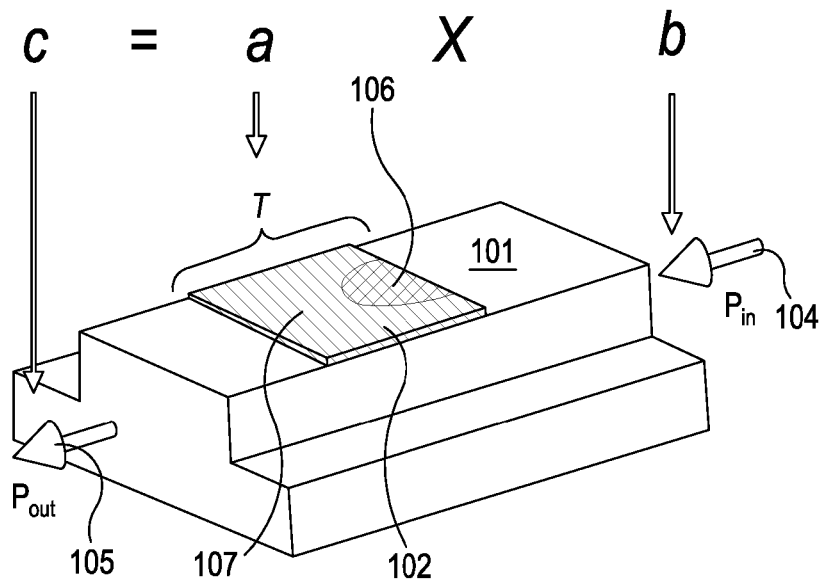

FIG. 2 represents the two numbers to be multiplied as a and b. Number a is mapped to a transmission property T of the waveguide 101 using a write pulse 103 that causes amorphization of a region 106 of the modulating element 102, leaving the remaining region 107 in the crystalline state. The energy of the write pulse $P_{Write}$ has a substantially linear mapping to the transmission T of the waveguide 101. The read signal 104 is attenuated in inverse proportion to the transmission T of the waveguide, thereby producing an output signal 105 corresponding with the multiplication of the write signal 103 and the read signal 104. The output pulse $P_{out} = (P_{Write}) \times P_{in}$, is the result of the multiplication by mapping the multiplicand a to T and the multiplier b to $P_{in}$. Such a process is considerably more efficient than that of multiplication by sequential addition as in conventional electronic implementations.

Figure 4:
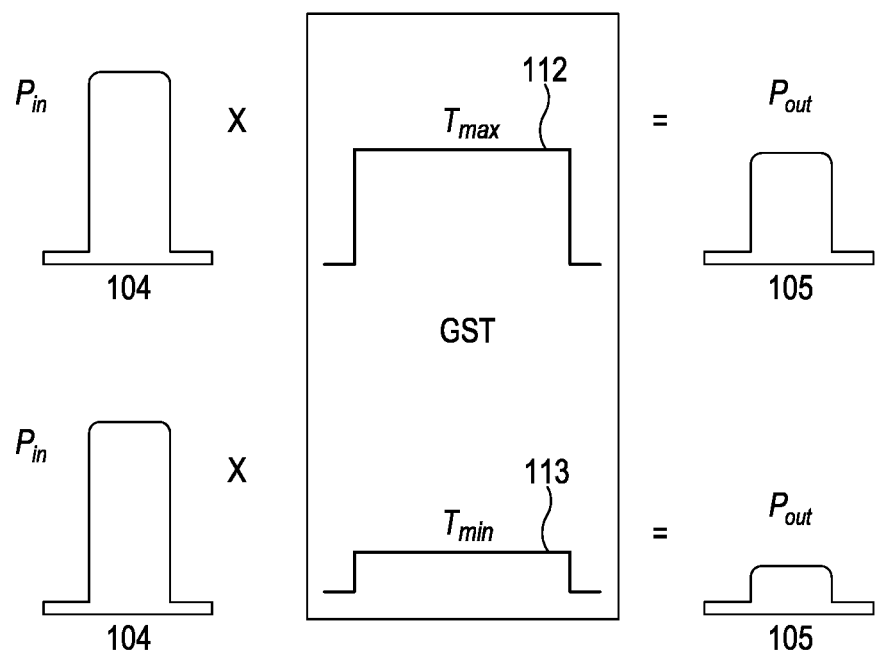
FIG. 4 illustrates how the state of the modulating element modulates the output pulse.

This process is illustrated in FIG. 4, which shows the multiplication of a read pulse 104, at a constant power level $P_{in}$, with a first write signal and a second write signal. The first write signal is a high power write signal that fully amorphizes the modulating element 102, resulting in a maximum transmission 112 $T_{max}$ of the waveguide. The second write signal is a low power write signal, resulting in the modulating element remaining fully crystalline, corresponding with a minimum transmission 113 $T_{min}$ of the waveguide 101. The output signal 105 resulting from multiplication of the read pulse 104 with the first write signal is higher than the output signal 105 resulting from the multiplication of the read pulse 104 with the second write signal.

Figure 5:
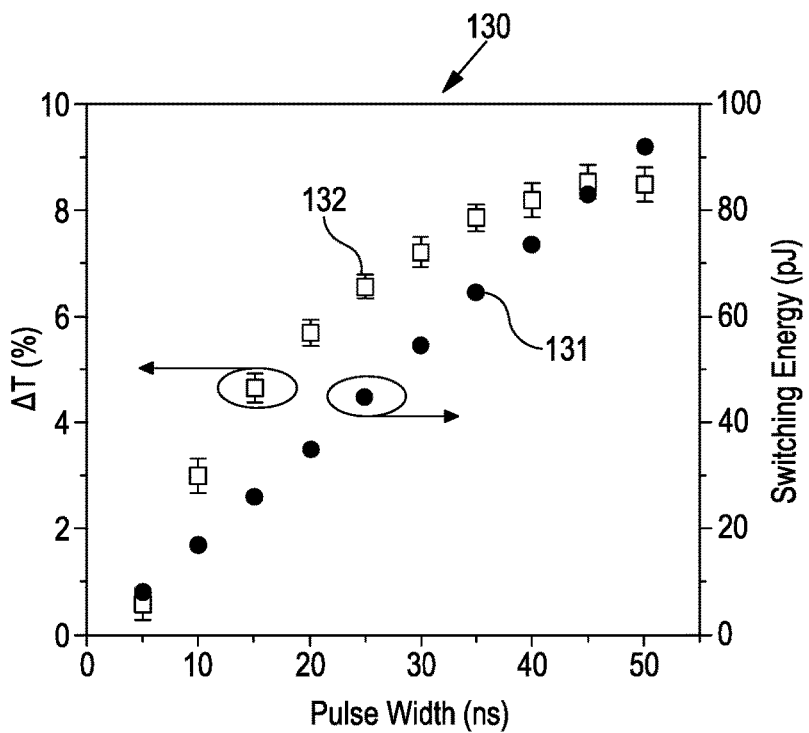
FIG. 5 is a graph showing the change in transmission of the waveguide with different duration write pulses (at fixed power)

In order to decrease the energy consumption and to improve the speed of operation, the operating parameters of an example device were explored. The write pulse duration was varied while keeping a constant power to reach different transmission levels. FIG. 5 shows the results obtained for a 1 µm long modulating element. The change in transmission ΔT as a function of pulse duration is plotted as series 132, and the energy corresponding with each pulse duration is plotted as series 131.

For pulses with duration longer than 45 ns there is a saturation due to the finite size of the modulating element 102, in which no more amorphous material can be obtained without using higher powers. Longer pulses therefore represent a waste in energy as the modulating element 102 will not further amorphize and could even be ablated. From these results, it can also be observed that 25 ns pulses induce a change equivalent to 75% of the maximum achievable transmission, which is a good balance between maximising contrast between states and reducing switching energy. Longer modulating elements 102 require greater pulse widths to reach saturation as there will be larger areas to amorphize. It was found that for GST modulating elements between 1 μm and 4 μm long, 25 ns pulses were enough to achieve clear transmission contrast among levels, limited only by the SNR of the measurement.

The energy consumption may be further reduced by using an unbroken erase signal to return the amorphous element to a (baseline) fully crystalline state from any arbitrary level. This can be achieved by using a two-step pulse.

Figure 6:
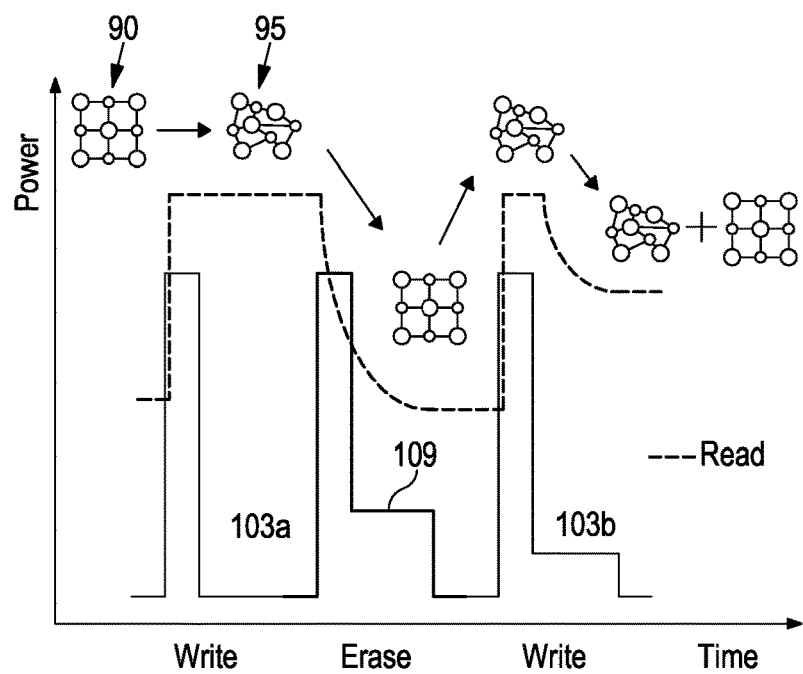
FIG. 6 is a graph illustrating different write signals: for amorphizing initially crystalline material; resetting an amorphous material to a fully crystalline state; and partially resetting a material from an amorphous state to a partially crystalline state.

FIG. 6 illustrates some different write signals. Write signal 103a is a single level signal of short duration (in this example 35 ns), for transitioning to a more (or fully) amorphous state 95 from a crystalline state 90. Erase signal 109 is a type of write signal that is intended to return the modulating element to a fully crystalline (baseline) state. The erase signal 109 comprises a two-step pulse, comprising a first step with a first power level and short duration (e.g. 35 ns) in which the material is amorphized, and a second step with a lower power level and longer duration (e.g. 100 ns) at which the material crystallizes. Write signal 103b is also a two-step pulse comprising a first step with a first power level and short duration (e.g. 35 ns) in which the material is amorphized, and a second step with a lower power level and longer duration (e.g. 100 ns) at which the material crystallizes. The write signal preferably does include any time gap between the first and second steps. The first step is selected to amorphize the material. The second step is selected to cause the material to crystallise in an amount that corresponds with the power level of the second step. In this way the state of the modulating element can be varied between a crystalline state and a fully amorphized state using pulsed write signals.

Figure 7:
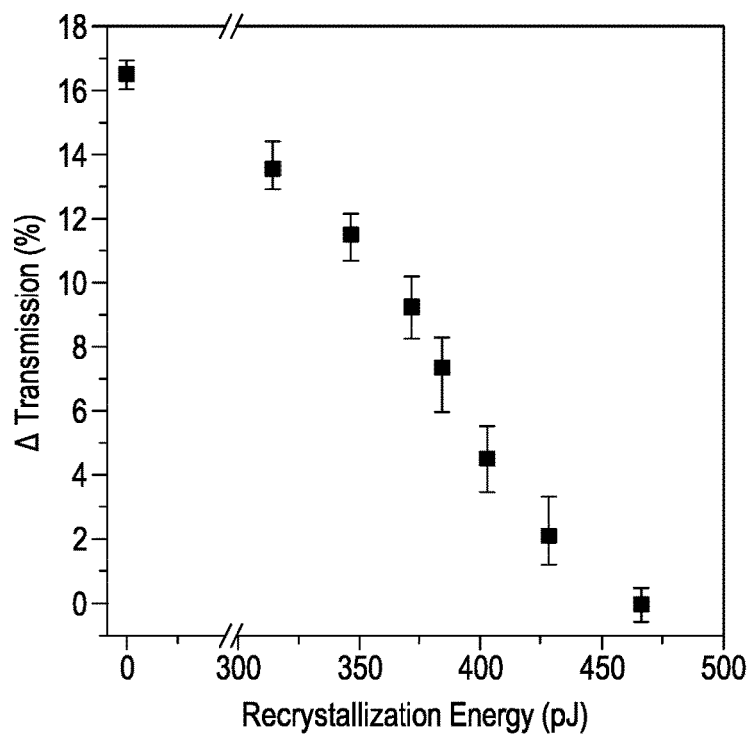
FIG. 7 is a graph showing the relationship between write pulse energy and an amount of recrystallization.
Figure 8:
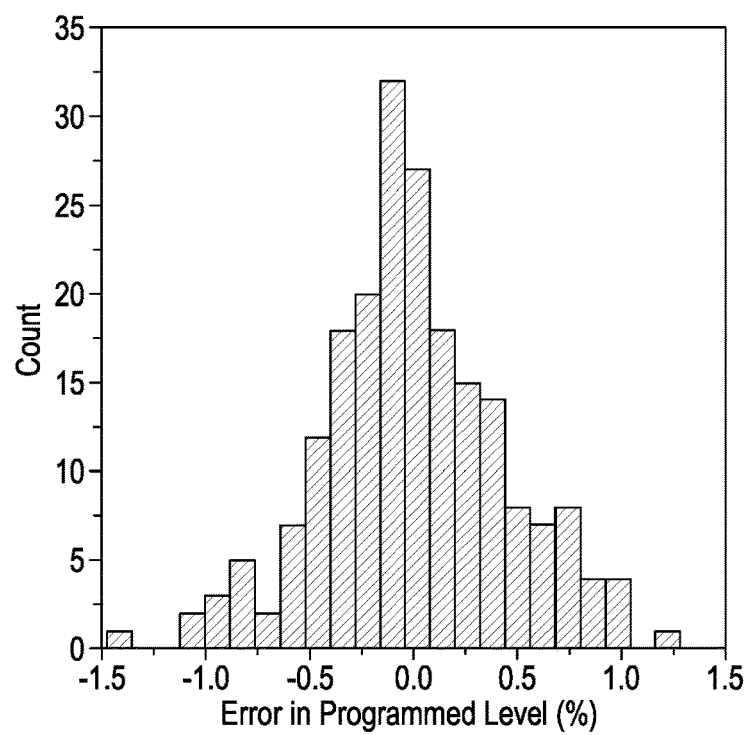
FIG. 8 is a histogram showing the programming error for going from an amorphous to a crystalline state.

FIG. 7 shows the relationship between the energy of a second, recrystallization portion of a two-step write pulse for recrystallization as a function of the change in transmission from a fully amorphous state. The error associated with the recrystallization process is greatest at intermediate levels where sensitivity to the recrystallization energy is highest, but a generally linear relationship is observed, with higher energy write pulses (corresponding with higher powers in the second step) resulting in more state transition. FIG. 8 shows the error in programmed level for going from an amorphous state to varying degrees of a crystallinity. The error limits the number of levels that can be accurately programmed.

Figure 9:
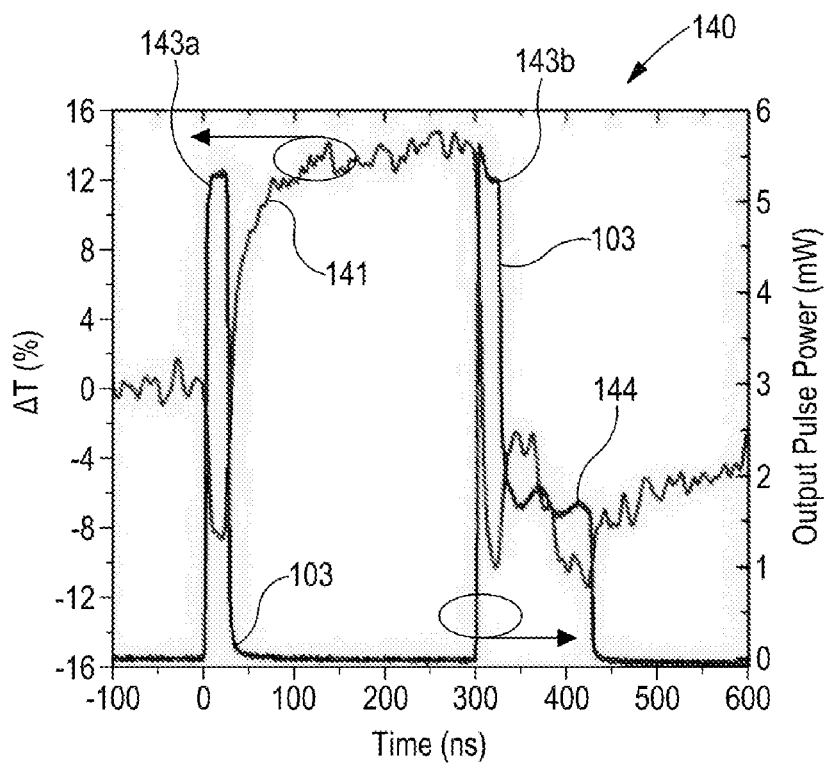
FIG. 9 is a graph showing the change in transmission over time during a write pulse which increases the amount of amorphous material in the modulating element and a reset pulse which increases the amount of crystalline material in the modulating element.

FIG. 9 illustrates both a short duration pulse for amorphization and an example two-step pulse for making the modulating element more crystalline. A plot 144 of measured output power of the write signal (after propagation through the waveguide 101) is shown, along with a plot 141 showing the transmission change ΔT (relative to a baseline fully crystalline state). At t=−100 ns, the modulating element is fully crystalline. At t=0 ns, a narrow high power (~14 mW input power, corresponding with approximately 5.5 mW detected after propagation) write pulse 143a(~25 ns) is used to amorphize the modulating element 102. The initial dip in transmission can be attributed to free carrier absorption, followed by a sharp increase in transmission once the narrow pulse is completed. The rate at which the transmission increases following the amorphization write pulse depends on the rate of thermal equilibration—absorption decreases as equilibrium is reached.

At t=300 ns the two-step erase/recrystallization pulse starts. The two-step pulse comprises a first high power (~14 mW), short duration (~25 ns) step, which amorphizes the modulating element 102. The pulse then switches to a second step with lower power and longer duration (~5.5 mW, around 0.4 times the first step), during which a crystallization process occurs in the modulating element 102 (as it is held at 150° C.<T<600° C.). The second step is sufficiently high power to prevent rapid quenching. In this example, the duration and power of the second step is long enough (~100 ns) to return the modulating element to the baseline state. This two-step pulse has a total switching energy of approximately 577.4 pJ.

This single two step pulse can replace the 19 individual 100 ns-pulse scheme that was used in the prior art (Ríos, C. et al. *Integrated all photonic non-volatile multi-level memory.* Nat. Photonics 9, 725-732 (2015)), in which each individual pulse of the erase train had switching energies ranging from 370 to 600 pJ, for a total of approximately 9.5 nJ and duration of 3.8 μs (to erase from the highest to the lowest transmission level). The two-step approach exemplified here therefore represents an improvement by a factor of more than 100 in terms of energy and 25 in terms of speed.

In terms of operational speed for a write/erase cycle, it can be observed in FIG. 9 that approximately 200 ns (including the pulse duration) are required to obtain a stable transmission level for both the write and the erase pulse. However, this time varies with the pulse width: the shorter the pulse, the shorter time it takes for the material to cool down and for the refractive index to stabilize, the timescale of which is governed by the thermo-optical effect. With a pulse separation of 200 ns and taking into account the cooling time for the erase pulse, the device can be operated at 2.5 MHz, even though the effect of the time separation between write and erase pulses on the level transitions have not been optimized.

Figure 10:
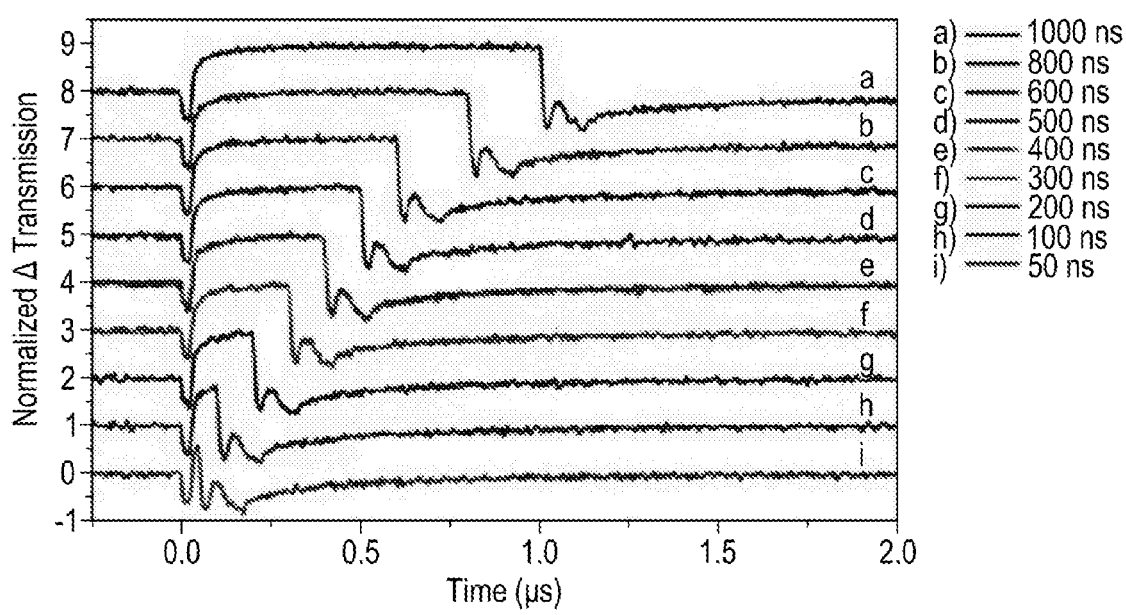
FIG. 10 is a graph showing the effect of varying the time delay between a write pulse that transitions a modulating element to an amorphous state and a subsequent erase pulse that returns the modulating element to a crystalline state.
Figure 11:
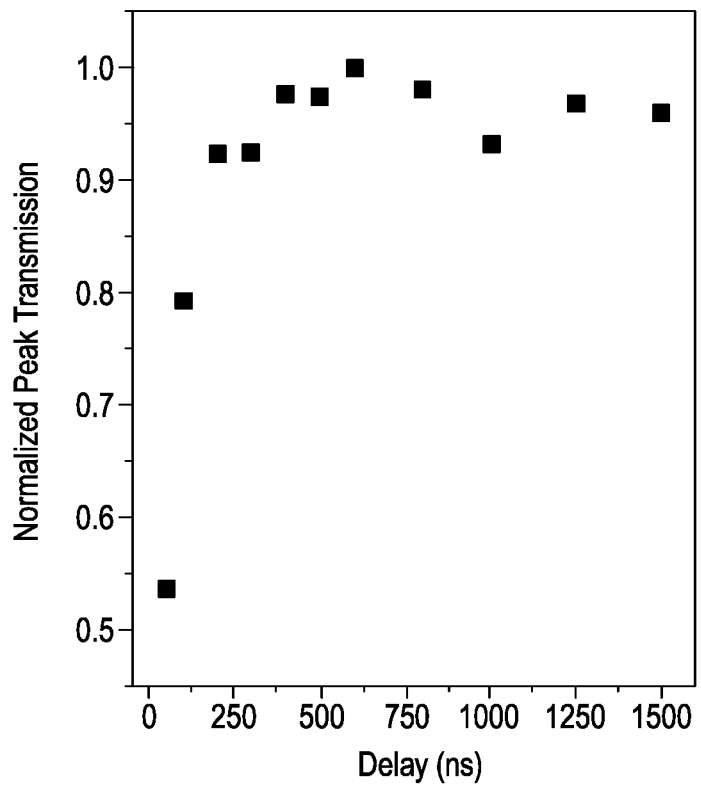
FIG. 11 is graph of the maximum transmission from FIG. 10 against time delay.

FIG. 10 shows the effect of varying the time delay between a write pulse that transitions to an amorphous state and a subsequent erase pulse that returns the element to a crystalline state. FIG. 11 plots the maximum (normalised) transmission from the graph of FIG. 10. A delay of around 200 ns or 250 ns is sufficient for the transmission of the modulating element to saturate at its steady state value (due to the thermo-optic effect).

Further improvements in terms of speed and energy can be achieved by decreasing the pulse width to even shorter times, especially the write pulse which could be a pico- or even femto-second pulse, thus reducing the dead time between the two pulses.

Figure 12:
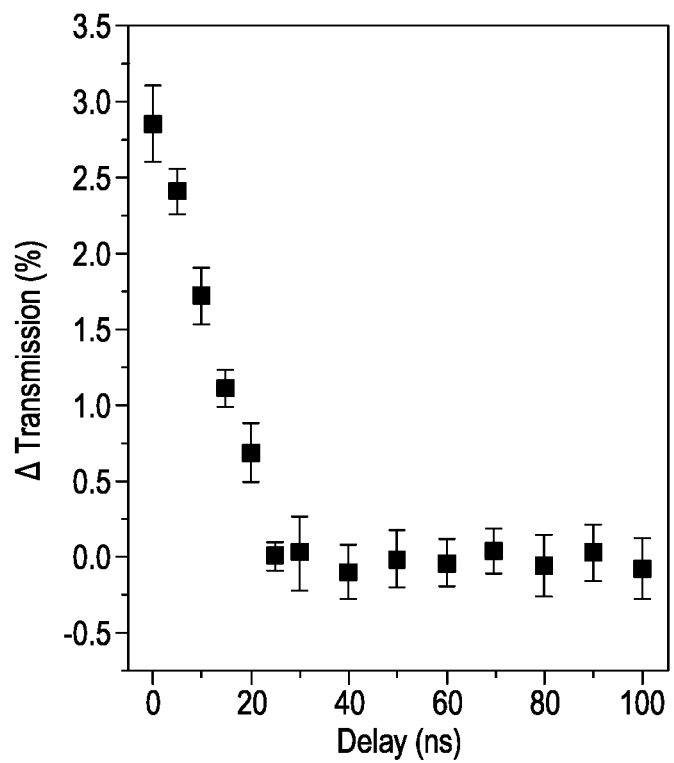
FIG. 12 is a graph showing the relationship between a change in transmission and a time delay between two write pulses, each with insufficient energy to cause a change in state on their own.

Delays between pulses that are shorter than required for thermal equilibration (in this example, less than around 250 ns can be used for correlation. For example, pulses that are below the switching threshold (of energy required to cause amorphization) may still change the state of the device if they are sufficiently close in time. This effect is illustrated in FIG. 12, in which a pair of write pulses with energy too small to cause a change in state do cause a change in transmission when the time delay between pulses is 25 ns or less.

Figure 13:
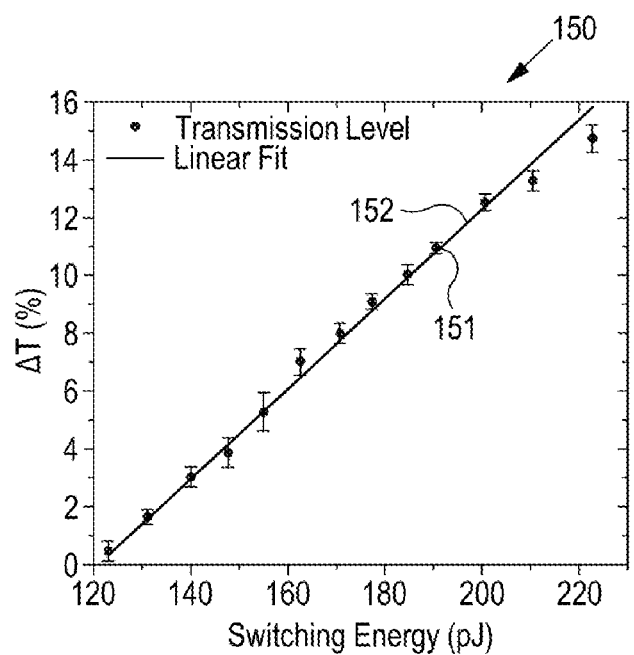
FIG. 13 is a graph showing the relationship between the energy of a write pulse and the resulting change in the intensity of transmitted light.
Figure 14:
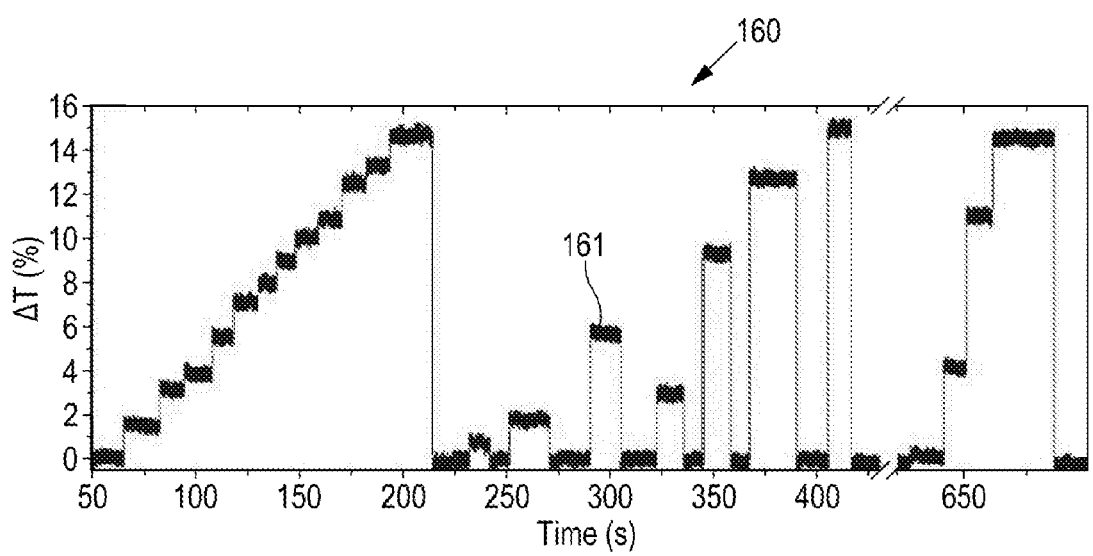
FIG. 14 is a graph showing multi-level conditioning of a device according to an embodiment, with 13 distinct levels of transmission.

FIG. 13 shows the relationship between write pulse energy 151 and energies used for the multilevel conditioning shown in FIG. 14 (transitioning from a crystalline baseline state to a more amorphous state with a short write pulse). A remarkably linear response is shown—the linear fit 152 corresponds with the data 151. For large energies, linearity is compromised due to saturation, which implies that the modulating element 102 is in its most amorphous state. The beginning of such saturation can be observed in FIG. 13 at write energies larger than 210 pJ. A 2 μm long modulating element was used in these experiments.

FIG. 14 illustrates the operation of a device according to an embodiment, in which 13 clearly distinguishable levels are written (and read) randomly. The number of levels is limited only by the SNR and the confidence interval. The plot 161 shows the change in transmittance ΔT over time as different levels are written to the modulating element.

Figure 15:
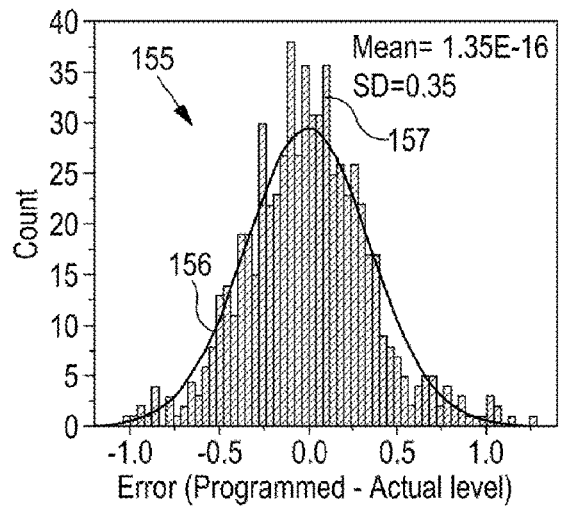
FIG. 15 is a histogram showing errors in programmed vs actual transmission level of a waveguide.

FIG. 15 shows the distribution of errors in programming levels as a histogram of error (intended ΔT-actual ΔT). To study the error in reaching the programmed transmission level, combinations of write and erase pulses were used to reach ten different transmission levels in twenty consecutive sequences. This experiment was repeated three times. The results of subtracting the actual transmission level after a particular transition from the originally programmed level are plotted in the FIG. 15. The programmed levels were taken as the average level after several cycles of switching during a conditioning process. The mean error is very small ($\sim10^{-16}$), and the standard deviation of the error is 0.35. A confidence interval for each transmission level can be established so that each level is uniquely distinguished. The minimum difference in transmission level between programmed states is determined by SNR but also by the variation in power of the pump pulses due to fluctuations in the electro-optical conversion. FIG. 15 shows a histogram of the error data 157 and a normal distribution 156 fitted to the data.

Figure 16:
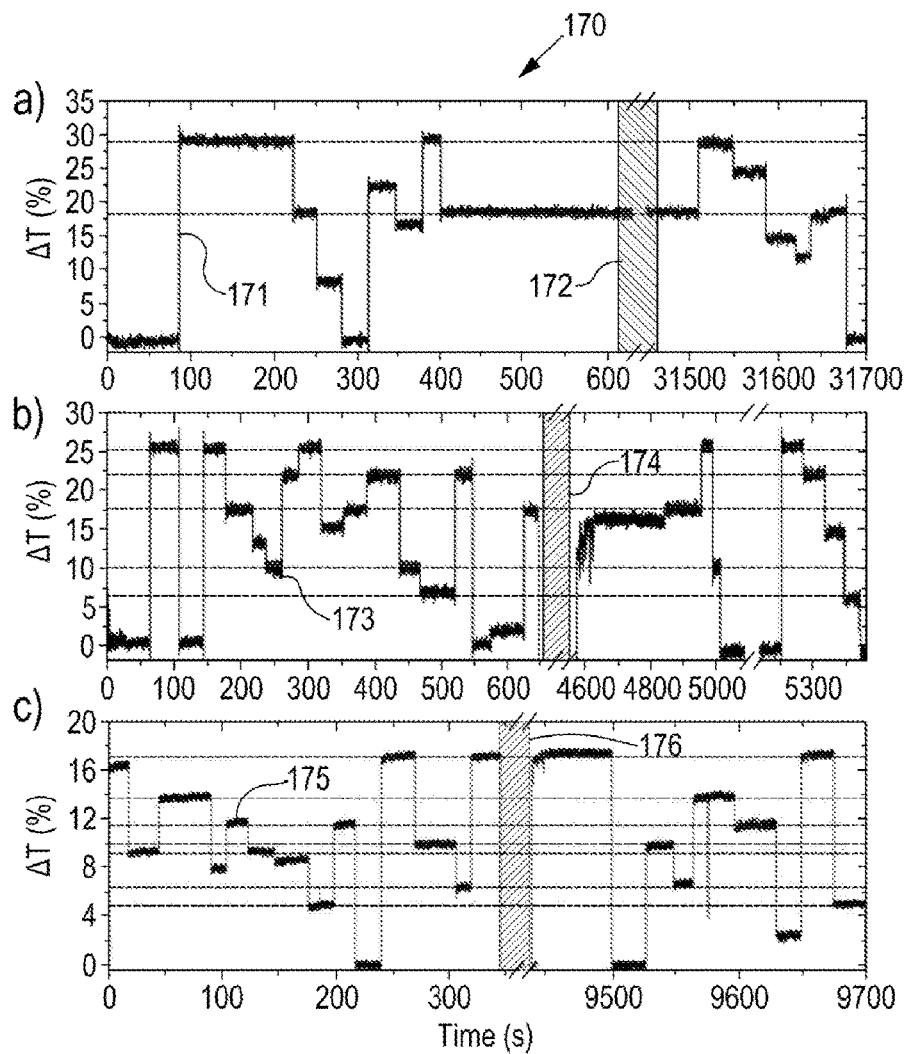
FIG. 16 is a set of three graphs illustrating the lack of drift in the transmission levels over time.

FIG. 16 shows transmission traces for measurement durations up to $10^4$ s, thereby demonstrating the stability of the programmed transmission levels and low levels of optical drift. Transmission levels in an arbitrary order were written and erased in a two 2 μm GST modulating element. Subsequently, the devices were kept in an intermediate transmission level for a prolonged period of time. FIG. 16*a*) shows the measured transmission 171 under multilevel operation of the cell using 50 ns pulses with energies in the range of 350-600 pJ to write (upward transitions) and a train of power-decreasing pulses to erase (downward transitions). The highlighted area 172 corresponds to ~8.5 h of constant measurement with a CW read signal of 0.1 mW (inside the waveguide). The transmission level measured after the long period is identical to that measured before.

FIG. 16*b*) shows a similar measurement to that of FIG. 16*a*), with the trace 173 showing measured transmission during multilevel operation. In FIG. 16*b*), the highlighted area 174 corresponds with turning the read signal OFF for around 1.5 h. A drift is observed between 4600 and 4800 s, which is corrected by sending the pulse energy of the level where the memory was originally set.

FIG. 16*c*) illustrates multilevel operation of a different device (to FIGS. 16*a*) and 10*b*)), again comprising a 2 μm-long GST modulating element. The write signals were 25 ns pulses with energies in the range of 200-360 pJ. The write and erase steps were done in the same way as for FIGS. 16*a*) and 16*b*). The read signal was turned off for a time of ~2 h during the highlighted area 176. In this case, the CW read signal power was reduced to 0.05 mW, which is enough to avoid drift.

Mechanical drift of the sample stage was observed as result of the relaxation of the picomotors holding the device in optical alignment over time. However, once the chip was placed in a stable position, the transmission level remained the same as before for the case in which the probe was kept ON. No measurable drift was observed for up to $10^4$ s of constant measurement, a property that may be attributed to the fact that the crystalline phase, which is more stable than the amorphous, determines and dominates the optical absorption. This drift-free process represents a big advantage for photonic memcomputing over its electrical analogue, which undergoes very significant resistance drift over time, thus preventing (or at least making it very difficult) to achieve reliable levels. Moreover, the same specific transmission levels were retrieved after the measurement: the multilevel conditioning is also preserved over time.

For the case when the read signal was turned off, a drift of nearly 9% was observed once the read signal was turned on again. This drift is due to the relaxation of the material when the probe is removed, given that the probe itself heats up the material to a constant temperature, causing a thermo-optical effect that modifies the values of the complex refractive index without crystallizing the material. Once the read signal is turned on, the multi-level conditioning is maintained. It is again possible to apply the same write signal to return to the same levels in which the memory was initially prepared. The drift can be avoided by simply keeping the read signal on at a low power when not actively reading (e.g. 0.05 mW, which is half of the active read signal power). With this continuous low power signal, the material relaxation is negligible, as shown in FIG. 16*c*).

Figure 17:
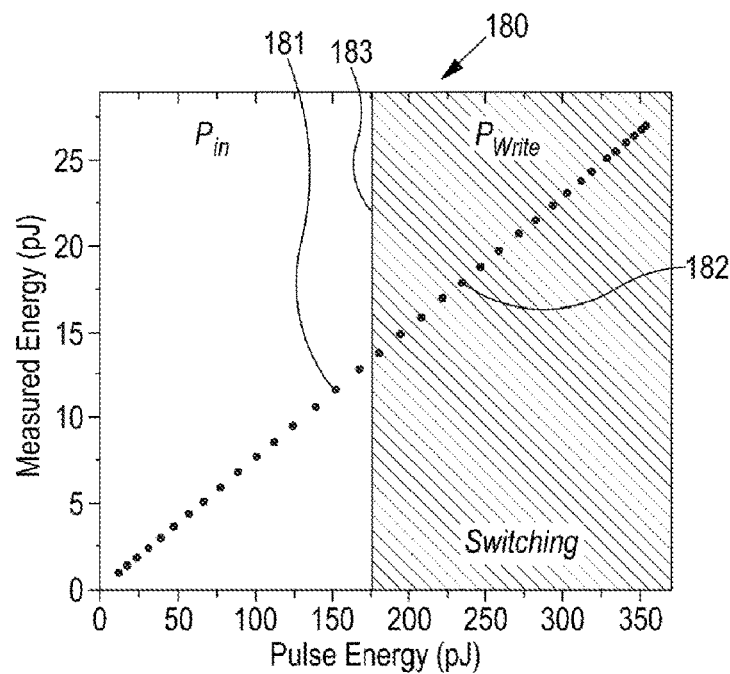
FIG. 17 is a graph showing input pulse energies for writing and reading and the corresponding measured energies (past the waveguide memory cell and a grating coupler)

FIG. 17 shows the relationship between input pulse energy and the corresponding measured energy (measured after the waveguide and a grating coupler). The measurements 181, 182 in FIG. 17 were carried out with the waveguide in the transmission baseline of the multilevel conditioning, as in FIG. 13. The line 183 marks a transition to pulse energies that induce switching to a partial amorphous state (after writing a particular amorphization state, the memory was erased down to the crystalline baseline again before the next pulse).

Figure 18:
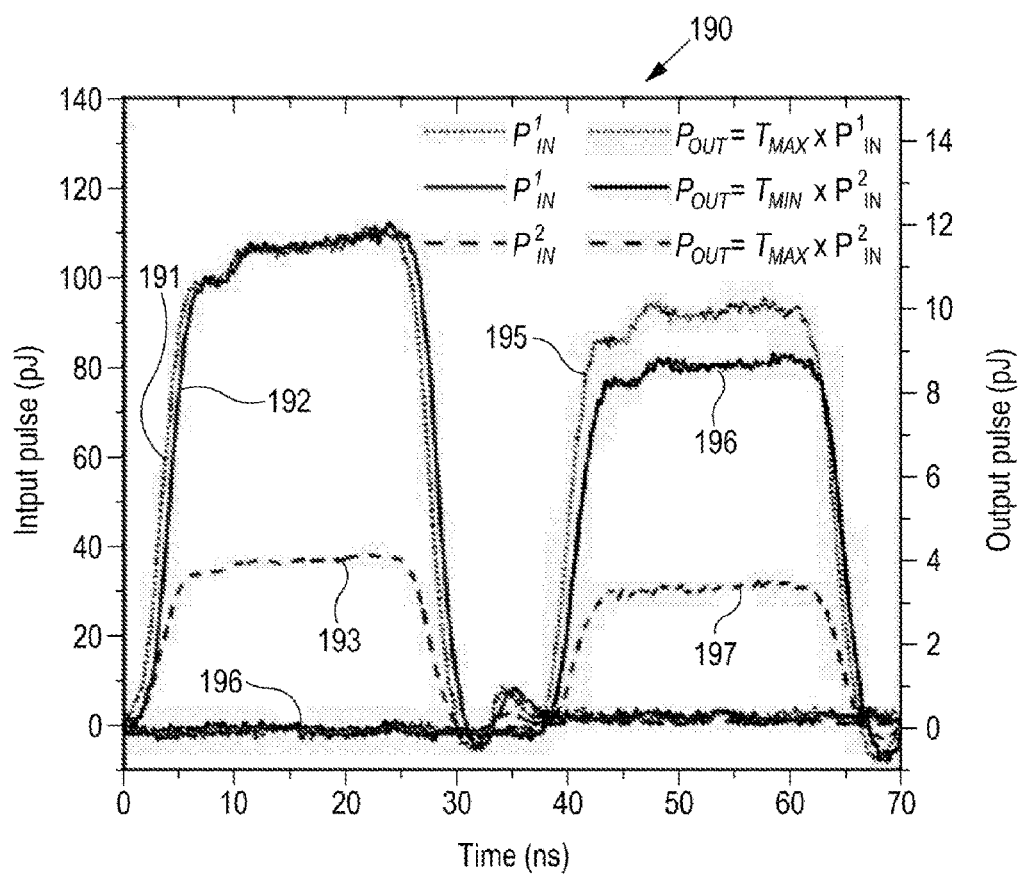
FIG. 18 is a graph showing three example multiplications.

FIG. 18 demonstrates multiplication a×b=c, with a,b,c $\in\{0,1\}$. The same device, with a 2 μm-long GST modulating element and the single-shot write and erase scheme described above was used. The multiplicand a was mapped to the transmittance of the waveguide T=ΔT+T0, where ΔT corresponds to a change in transmission, which is a linear function of the $P_{Write}$ pulse (as shown in FIG. 7) and T0 is the baseline transmission level (fully crystalline). Subsequently, the multiplier b is mapped to the energy of a second pulse $P_{in}$. The result of the multiplication is calculated from the output of this latter pulse, which is equivalent to $P_{out}=T\times P_{in}$. Both $P_{Write}$ and $P_{in}$ were generated in the manner described above, by tuning the pulse power at the EOM (see materials and methods).

FIG. 17 shows the input pulse energies used for both multiplicand a and multiplier b, highlighting the energies that will induce phase switching. The measured energy corresponds to the output pulse energy after propagating past the GST cell and through one grating coupler. In these demonstrations $P_{write}\in\{180,354\}$ pJ or equivalently, T∈{0, 0.143} (see FIG. 7), and $P_{in}\in\{0,112.8\}$ pJ. The linear response of the memory device demonstrated in FIG. 17 is remarkable, and allows for easy mapping of a scalar to the pulse energy without relying on fitting functions.

FIG. 18 shows three multiplications, plotting the measured $P_{in}$ values 191, 192, 193 and measured $P_{out}$ values 195, 196, 197 over time. The time delay between pulses is due to the difference in optical path between the reference pulse and the pulse that is coupled into the photonic chip, both obtained from the pump pulse using a 90/10 beam splitter.

In the first multiplication, the modulating element 102 is set to a maximum transmission level T=0.143 by a 354 pJ write signal (corresponding with a=1). A read pulse 191 with $P^1_{in}$=112.8 pJ at 0<t<35 ns (corresponding with b=1) was multiplied with the write signal, causing an output pulse 195 $P_{out}$ at 35<t<70 ns with a value of approximately 10 pJ, (corresponding with c=1).

In the second multiplication, the modulating element 102 is set to a minimum transmission level T=0 by a 180 pJ write signal (corresponding with a=0). A read pulse 192 with $P^1_{in}$=112.8 pJ at 0<t<35 ns (corresponding with b=1) was multiplied with the write signal, causing an output pulse 196 $P_{out}$ at 35<t<70 ns with a value of approximately 8.5 pJ, (corresponding with c=0). The result when multiplying by T=0 corresponds to a level-specific offset.

In the third multiplication, the modulating element 102 is set to a maximum transmission level T=0.143 by a 354 pJ write signal (corresponding with a=1). A read pulse 193 with $P^2$=38.9 pJ at 0<t<35 ns (corresponding with b=0.4) was multiplied with the write signal, causing an output pulse 197 $P_{out}$ at 35<t<70 ns with a value of approximately 3.5 pJ, (corresponding with c=0.4).

In FIG. 18, it can be observed that the output powers $P_{out}$ have distinct energies, which can be measured and then rescaled to obtain the result of the three respective multiplications: 1×0=0, 1×1=1, and 1×0.4=0.4. Note that the lowest transmission level of the three, which corresponds to 0.4, is actually smaller than the level for 0. This is due to the fact that even in the fully crystalline state, GST will not absorb all the light from the read signal even when it is in a low transmission state (unless a longer modulating element is used to increase the optical attenuation). Therefore, there is an offset given by the transmission baseline T0, which has to be subtracted from every multiplication to enable exact linear rescaling to the $c \in \{0,1\}$ results.

Figure 19:
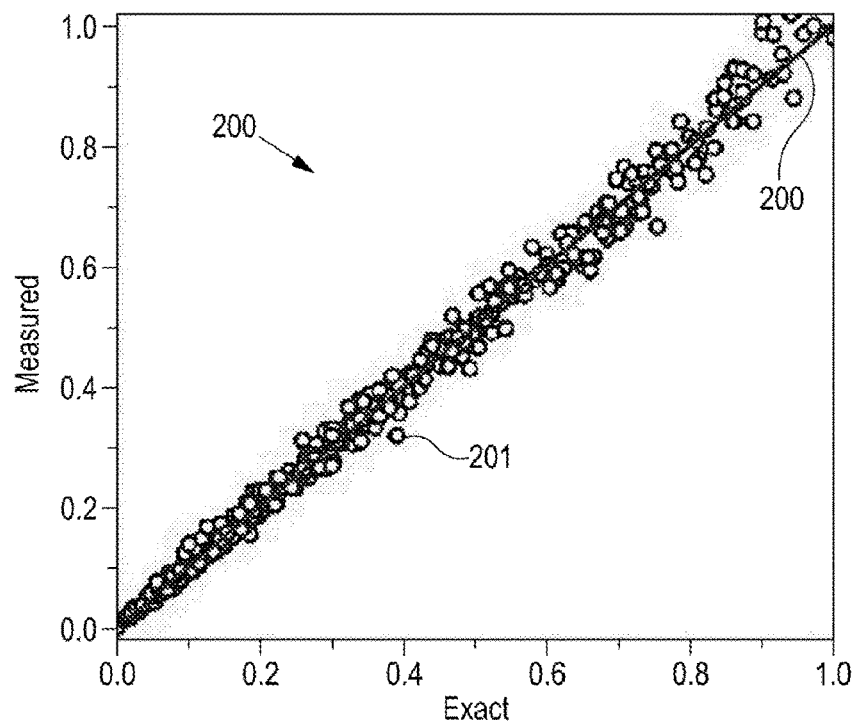
FIG. 19 is a graph showing 429 example multiplications, with measured results plotted against expected results.

FIG. 19 shows 429, c=a×b multiplications plotted as a scatter series 200. These were obtained using 13 different, equally spaced, values for T (reached with $P_{Write} \in \{180, 354\}$pJ) creating 13 values for the multiplicand a, and using 33 different values for $P_{in} \in \{0, 112.8\}$pJ creating 33 scalars corresponding to b. $P_{Write}$ was sent first, to establish a transmission level T followed by the 33 $P_{in}$ pulses, before changing levels again. The measured value of c (inferred from the $P_{out}$ signal) is plotted against the exact value of c based on the mapping of the input parameters the a and b. The exact value was calculated from linear fits obtained during characterization of the device and subsequent mapping to $\{0,1\}$ for both multiplicand and multiplier (a and b). The measured value corresponds to the average of the output pulse energy, correcting the offset, and normalized to $\{0,1\}$.

Figure 20:
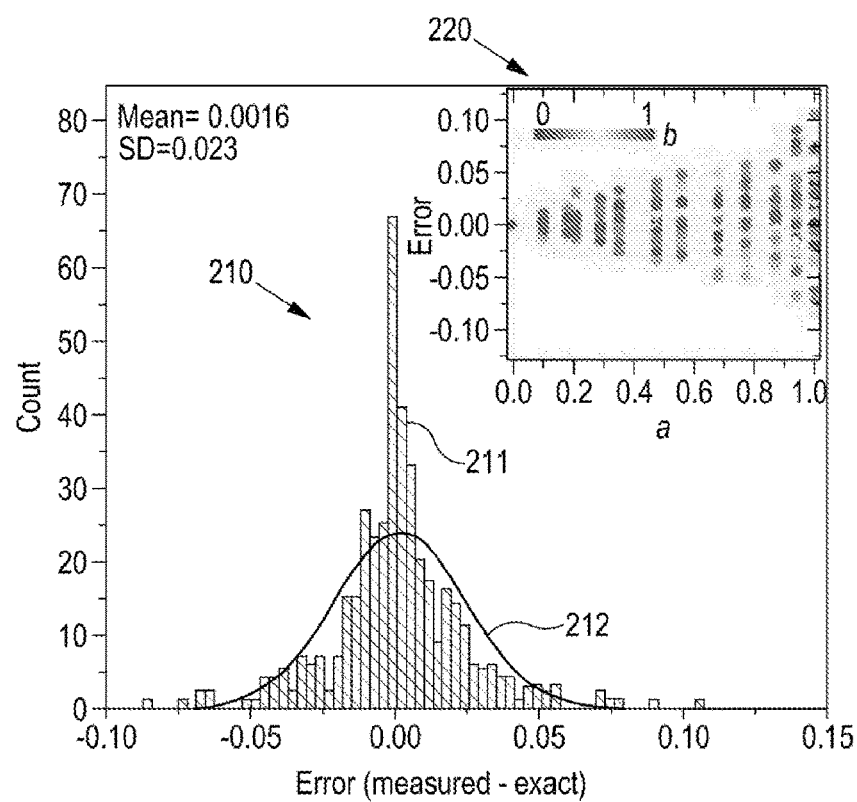
FIG. 20 is a histogram illustrating the distribution of errors in the multiplications shown in FIG. 19, with an inset showing the error as a function of the values of the first and second values.

FIG. 20 is a histogram 210 of the error of the multiplications that are shown in FIG. 19, with an inset 220 graph showing the relationship between error and a and b. The line 212 on the histogram corresponds with a normal distribution fit to the data 211, which has a mean=0.0016 and a standard deviation of 0.023. The error grows approximately linearly as a function of the values of a and b which explains the spread of $P_{out}$ for values of c close to 1.

While the results of the multiplication are not exact due to factors such as the fluctuations in the values of T, as shown above in FIG. 15, this kind of multiplication operation has proved useful in application areas such as machine learning. Moreover, in application domains where arbitrarily high accuracy is required, mixed-precision computing can be employed where a low precision multiplication unit (according to an embodiment) is used in conjunction with a high precision unit (which may be conventional). Moreover, the non-volatility of the levels implies that the multiplicand is fixed until the next pulse excitation changes its state. This property, in an architecture comprising several scalar multiplying units, could be exploited to calculate matrix-vector multiplications or find solutions to systems of linear equations using iterative Krylov subspace methods, such as the Conjugate Gradient or the Generalized Minimum Residual. They can also be used for the forward and backward propagation during the training of deep neural networks. Using such methods, an input matrix A could be mapped to photonic memory cells and the solution x of Ax=b with A $\in \mathbb{R}^{N \times N}$ and b, x $\in \mathbb{R}^N$ computed using iterative algorithms.

This disclosure provides proof-of-concept of the multiplication of two scalar numbers using phase-change photonic memcomputing. This can be achieved using the interaction of two optical signals, each representing a number to be multiplied—one with energy above the switching threshold and another one below—with a modulating element near-field coupled to a photonic waveguide. Such a device may have a substantially linear response which helpfully avoids the need for fitting functions (in contrast to pseudo-ohmic electrical phase-change memory devices). Furthermore, an erase mechanism is disclosed in which only a single pulse is required; compared to the train of energy decreasing pulses used in the prior art. This is an important advance, as the duration of the erase operation may thereby be reduced from microseconds to ~100 ns, and from total energies of up to tens of nJ to the sub-nJ region. Moreover, it has been confirmed that the change in transmission saturates when increasing the duration of the pump pulse (with fixed power); by optimizing the pulse length it has been demonstrated that a single 25 ns pulse is sufficient to reach distinguishable levels from the fully-crystalline (baseline) state in memory cells comprising 1 μm and 2 μm long GST modulating elements. It has been shown that a device according to embodiments can have negligible transmission fluctuation in up to $10^4$ s, and that the SNR, errors in achieving the programmed level, and the noise are ultimately limited by the quality of the read-out electronics used in the system. These results confirm the potential of phase-change materials in photonic hardware computational paradigms. While there is plenty of room for improvement, the capabilities disclosed herein hold promise for all-optical non-volatile data storage, all-optical and electro-optical switches, and for performing optically computational tasks with collocated memory and processing.

Measurement Setup

In the results discussed above, all optical read, write and erase signals were guided within the waveguide. To avoid interference, two different C+L CW tunable laser sources were employed, wavelengths of 1598 nm (TSL-550, Santec) and 1590 nm (N7711A, Keysight) were chosen for the read signals and erase/write signals, respectively. The erase/write pulses—as well as the multiplicand pulse—were subsequently generated with an electro-optical modulator (Lucent Technologies, 2623NA), which was controlled by a 100 MHz electrical pulse generator (AFG 3102C, Tektronix). The pulse was further power amplified by a low-noise erbium-doped fibre amplifier (AEDFA-CL-23, Amonics). Both the erase/write pulses and the read signal were coupled into the photonic device using integrated grating couplers with transmission peak at 1598 nm and coupling efficiencies of ~20%. A counter-propagating scheme (in which erase/write signals propagate in the opposite direction to the read signals) was used to ease the separation of the signals. Tunable optical filters (OTF-320, Santec) were introduced to the optical lines to further suppress noise resulting from reflections. At one output of the device, the CW read signal was divided into two beams using a 90/10 beam splitter to measure the time-resolved and the long-term transmission with a 200 kHz low-noise photoreceiver (NewFocus, 2011) and a 125 MHz photodetector (New Focus, 1811), respectively. At the other output, the transmitted pulses were monitored using a 1 GHz photodetector (NewFocus, 1611).

Figure 21:
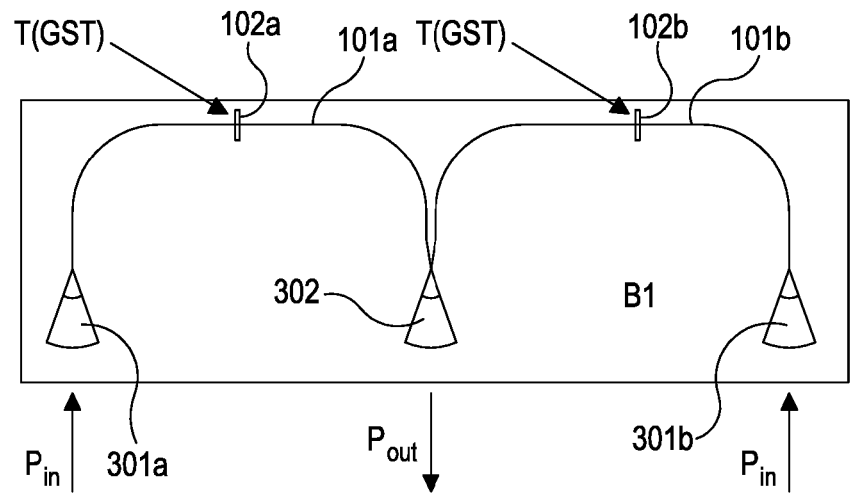
FIG. 21 is a micrograph of a first and second waveguide for combining the results of two multiplications.

FIG. 21 shows a device comprising a first waveguide 101*a* and a second waveguide 101*b*. A first input grating coupler 301a is coupled to a first end of the first waveguide 101a, and a second input grating coupler 301b is coupled to the first end of the second waveguide 101b. An output grating coupler 302 is coupled to the second end of both the first and second waveguides 101a, 101b. Each waveguide 101a, 101b, respectively comprises a GST modulating element 102a, 102b. This device can be used to combine the results of two multiplications, for example to approximate the multiplication of a matrix with a vector.

For example, the first waveguide can be used to multiply a (a write signal encoded as a transmission state of the first waveguide) and b (a read signal, modulated by the transmission state of the first waveguide). The second waveguide can be used in a similar way to multiply c (a write signal encoded as a transmission state of the second waveguide) and d (a read signal, modulated by the transmission state of the second waveguide). The result of the multiplication from the first and second waveguide will be combined at the output grating coupling, to give a×b+c×d. A second device, using the same read signals b and d can be used in a similar way to determine f×b+g×d with f and g encoded to transmission states of the second device. In this way, the calculation:

$$\begin{bmatrix} a & c \\ f & g \end{bmatrix} \begin{bmatrix} b \\ d \end{bmatrix} = \begin{bmatrix} a \times b + c \times d \\ f \times b + g \times d \end{bmatrix}$$

can be calculated (or approximated).

As an alternative to using a second device, the same device could be used at different times to calculate the first and second row of the output vector.

Figure 22:
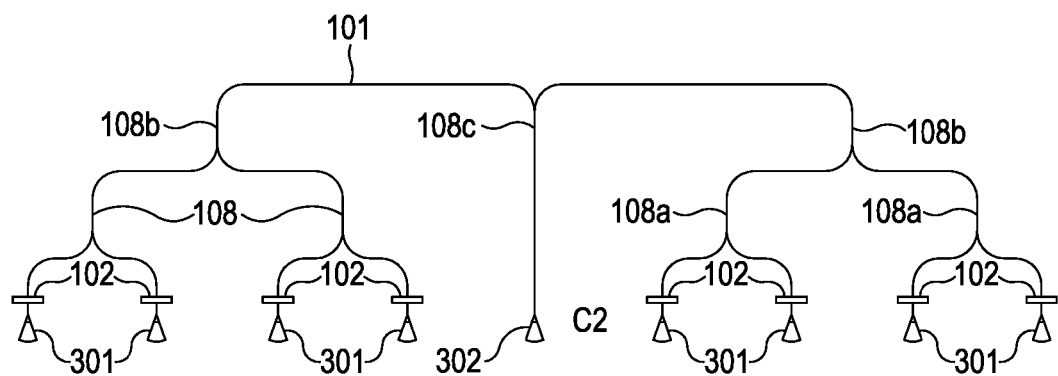
FIG. 22 is a schematic of a device comprising 8 modulating elements, which can be used to determine the product of a 8 element vector and an N×8 matrix.

FIG. 22 illustrates a device for determining multiplications between higher dimensioned matrices and vectors. The device in FIG. 22 has 8 input coupling gratings 301 and 8 corresponding modulating elements 102, and eight of these devices can be used to determine the product of an N×8 matrix with a 1×8 vector. The output from each pair of modulating elements 102 is combined at a first level combiner 108a. The output from first level combiners 108a is combined at a respective second level combiner 108b. The outputs from the second level combiners are combined at an output combiner 108c. The same device can be used to multiply determine each of the N columns of the matrix with the vector by codifying each of the N columns to a set of 8 write pulses. Each set of pulses can be sent/multiplied at a different time.

Figure 23:
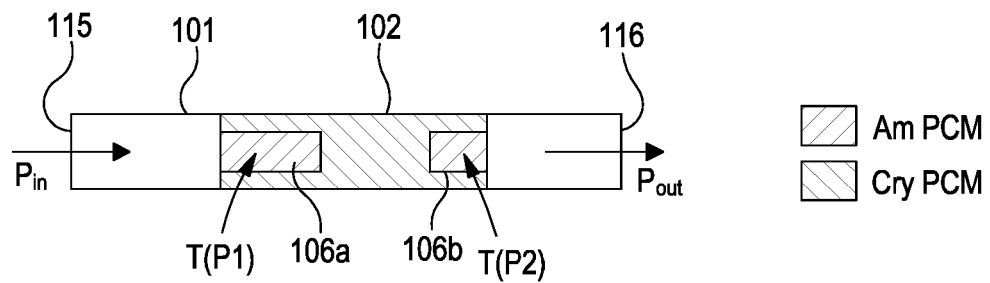
FIG. 23 is a schematic illustrating adjusting the state of a modulating element using write signals that propagate through the modulating element in different directions.

The examples discussed above have used a write signal from a single direction, but it is also possible to use a write pulse from more than one direction, thereby encoding more than one item of information in the modulating element. This is illustrated in FIG. 23, in which a first write pulse $P_1$ propagating through the waveguide 101 in a first direction is used to write an amorphous region 106a at a first end of the modulating element 102, and a second write pulse $P_2$ propagating through the waveguide 101 in a second opposite direction is used to write an amorphous region 106b at a second, opposite, end of the modulating element 102.

In this way a simple modulating element can be used to multiply 3 or more numbers, as:

$$P_{out} = P_{in}T(P_1)T(P_2)$$

Taking the offset into account (T actually being T+T0), we can write:

$$P_{out} = P_{in}(T(P_1) + T_0)(T(P_2) + T_0') = $$
$$P_{in}T(P_1)T(P_2) + P_{in}T(P_1)T_0' + P_{in}T(P_2)T_0' + P_{in}T_0T_0'$$

The first term in the expanded expression corresponds with three term multiplication and the second two terms correspond with the addition of two multiplications. The final term represents noise which can be removed, or made use of for security applications. A calculation can be envisaged that cannot be decoded without knowledge of the transmission offset of the waveguide. Waveguides could be engineered with specific transmission offsets to provide a specific "key" characteristic to that waveguide (for example by trimming of the modulating element).

Figure 24:
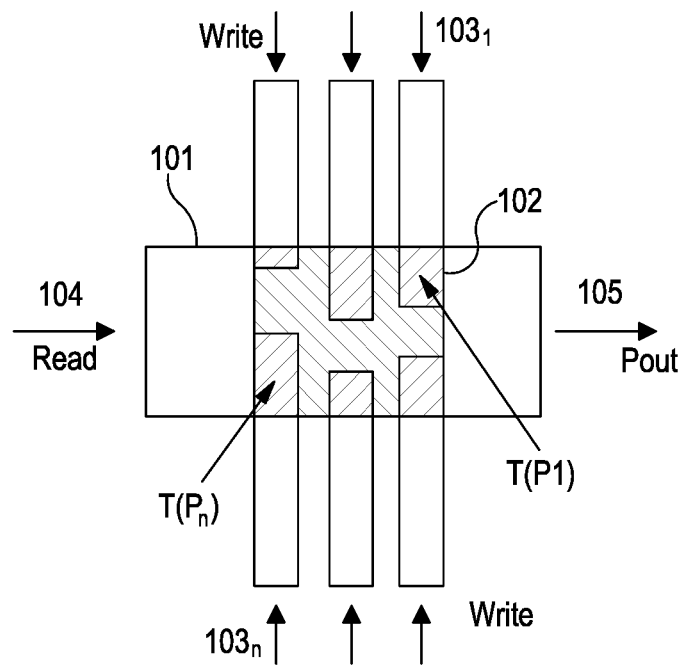
FIG. 24 is a schematic of a modulating element that is addressable by more than one waveguide, with six transverse waveguides for adjusting the state of different regions of the modulating element.

FIG. 24 illustrates an extension of this idea, in which a modulating element 102 is addressable with more than one waveguide for carrying write signals $103_1$ to $103_n$ that can adjust the state of the modulating element with an optical signal. In this example there are six transverse waveguides for writing to the modulating element 102 in a direction transverse to the direction of propagation of the read signal 104. This sort of multiply-addressed modulating element may be used with each area performing a separate computation, measured by a common read signal 104 (based on output signal 105). Alternatively, devices of this type may be used to perform multiplications and additions of many numbers, depending on the number of waveguides addressing the modulating element 102. This sort of device could be used in stochastic computing as a Neuron, in which each section of an amorphized modulating element provides a weighting to a given task.

Figure 25:
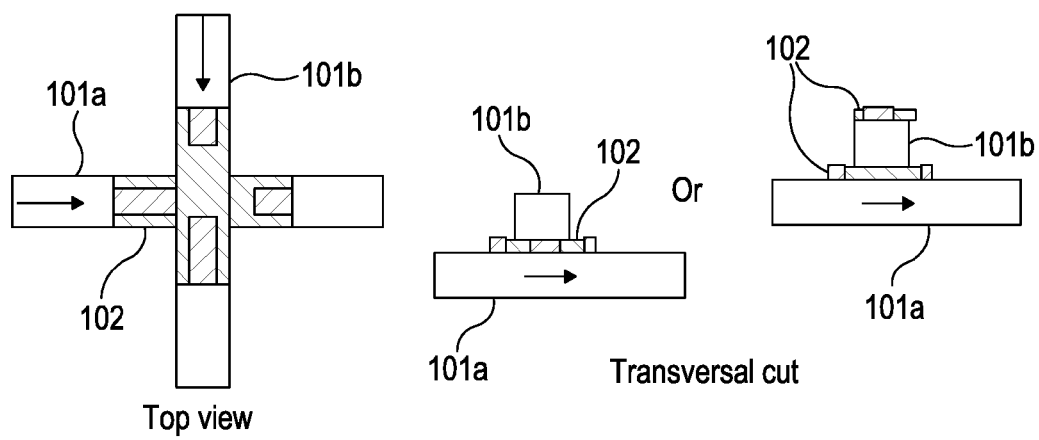
FIG. 25 is a schematic of a 3D stacked architecture for a device, in which a modulating element is shared between stacked waveguides.

FIG. 25 illustrates a 3D stacked architecture for a device, in which a first and second waveguide 101a, 101b cross at the modulating element 102. The modulating element 102 may be sandwiched between the waveguide cores, thereby being coupled to both, and/or placed on an external side of one or both of the waveguides 101a, 101b so that at least part of the modulating element 102 is not coupled to both waveguides 101a, 101b.

FIG. 43 illustrates a device 500 for determining the multiplication of a vector by a matrix, and specifically in this example for determining the output vector corresponding to the multiplication of an input 3×1 vector by a 3×3 matrix. The device therefore implements the calculation G×P=b:

$$\begin{pmatrix} G_{11} & G_{12} & G_{13} \\ G_{21} & G_{22} & G_{23} \\ G_{3l} & G_{32} & G_{33} \end{pmatrix} \begin{pmatrix} P_1 \\ P_2 \\ P_3 \end{pmatrix} = \begin{pmatrix} b_1 \\ b_2 \\ b_3 \end{pmatrix}$$

The device consists of a plurality of low loss waveguide crossing structures. In this example, which implements a 3×3 matrix multiplication, the device consists of three parallel input row waveguides 502a, 502b and 502c (rows 1 to 3 respectively) crossing with three output column waveguides 504a, 504b and 504c (columns 1 to 3 respectively) which are generally perpendicular to the input waveguides but could be at any oblique angle.

The input vector components $P_1$, $P_2$ and $P_3$ are encoded in the intensities of three optical input pulses at unique wavelengths $\lambda_1$, $\lambda_2$, and $\lambda_3$ introduced into input row waveguides 502a, 502b and 502c respectively.

Adjacent each waveguide crossing is a waveguide coupling element 506. The waveguide coupling element evanescently couples a fraction of the optical intensity from the adjacent row waveguide, where the fraction coupled depends on the length of a portion of the waveguide coupling element placed in close proximity to, and running approximately parallel to, the adjacent row waveguide. Thus the fraction can be accurately set at the design and manufacturing stage of the device. Each waveguide coupling element has a modulating element 508 disposed thereon, in a similar manner to that described above with reference to e.g. FIG. 1. The modulating element consists of a phase change material, e.g. GST. In the device implementing a 3×3 matrix there are a total of 9 waveguide coupling elements and 9 associated modulating elements. The matrix elements $G_{mn}$, are encoded in the transmission states of the modulating elements.

The fraction of the optical intensity coupled from a row m into the waveguide coupling element at the crossing of row m and column n is characterized by a coupling efficiency $\eta_{nm}$. The fraction of optical intensity coupled from the waveguide coupling element at the crossing of row m and column n into the column n is characterized by a coupling efficiency $\eta'_{nm}$. By choosing $\eta_{1m}=1/3$, $\eta_{2m}=1/2$ and $\eta_{3m}=1$ the input optical intensity $P_m$ is split equally between the three coupling elements on a given row m. In general the coupling efficiency $\eta_{nm}$ is chosen such that:

$$\eta_{nm} = \frac{1}{N+1-n}$$

where N is the dimension of the vector transformation implemented by the device (e.g. N=3 for the device implementing a 3×3 matrix transformation), n indexes the column number and m indexes the row number.

The output 510a of the first column 504a is used to determine vector element $b_1$, the output 510b of the second column 504b is used to determine vector element $b_2$, and the output 510c of the third column 504c is used to determine vector element $b_3$. For example, for the device shown in FIG. 43 the optical output of the first column will be given by:

$$\eta_{11}\eta'_{11}(1-\eta'_{12})(1-\eta'_{13})G_{11}P_1(\lambda_1)+\eta_{12}\eta'_{12}(1-\eta'_{13})$$
$$G_{12}P_2(\lambda_2)+\eta_{13}\eta'_{13}G_{13}P_3(\lambda_3)=1/9(G_{11}P_1(\lambda_1)+$$
$$G_{12}P_2(\lambda_2)+G_{13}P_3(\lambda_3))=1/9 b_1$$

The vector elements $b_1$, $b_2$, and $b_3$ may be directly obtained by re-scaling the detected optical output intensities of the first, second and third columns respectively—to account for the common scale factor of 1/9. This scale factor may be determined by a prior characterization of the device. In the general case where there is not a common scale factor multiplying each component $P_1$, $P_2$ and $P_3$ of the above equation, but instead different scale factors for each term, the output of each column may be spectrally resolved in order to factor out the scale factor for each term separately, based on a prior calibration of the device. This is one reason why it may be desirable to use different wavelengths to encode the vector elements $P_1$, $P_2$ and $P_3$.

The modulating elements 508 may be switched either optically or electrically in the manner generally described herein. If the modulating elements are to be switched optically then the coupling efficiencies $\eta'_{nm}$ are preferably chosen such that:

$$\eta'_{nm} = \frac{1}{m}$$

where m indexes the row number as before and $\eta'_{nm}$ is independant of the column index. In this manner, the modulating elements may be individually optically addressed using overlapping optical pulses as described with reference to FIG. 44. Specifically, in this example two input optical write pulses 520, 522 each with power P and the same wavelength are sent into the device—one into row 2 and one into column 3. The pulses may have a duration in the range from 0.5 ps to 10 ps. For example, the pulses may have a duration of 1 ps. The pulses are sent into the device with a relative delay such that they will temporally overlap inside the modulating element which is to be switched. In the example of FIG. 44, the modulating element 524 which is to implement the matrix element $G_{32}$ is the target for the optical write pulses. Because the coupling efficiencies $\eta'_{nm}$ are chosen according to the expression above, the modulating element implementing matrix element $G_{32}$ will receive 2/3×P, whereas the other modulating elements associated with row 2 and column 3 will only receive 1/3×P. In this manner, if P is chosen such that 2/3×P is above the threshold required to change the modulating element state, but 1/3×P is below the threshold, then only the modulating element implementing matrix element $G_{32}$ will be affected by the optical write pulses.

If the modulating elements are switched electrically instead of optically then it may not be necessary to choose $\eta'_{nm}$ as set out above. If directional waveguide coupling elements are used, it would be possible to choose $\eta'_{nm}=1$ for all coupling elements, whilst $\eta_{nm}$ is still chosen in accordance with the expression above. In this manner, when the output 510a of the first column 504a is used to determine vector element $b_1$ the output 510a of the first column 504a will be given by:

$$\frac{1}{3}(G_{11}P_1 + G_{12}P_2 + G_{13}P_3) = \frac{1}{3}b_1$$

with corresponding expressions for the second and third columns. In this case, the weighting of each component $P_1$, $P_2$ and $P_3$ is 1/3 as opposed to 1/9 in the previous example. The use of directional waveguide couplers may also increase the overall efficiency of the device.

FIG. 45 illustrates schematically a portion of the device of FIGS. 43 and 44 which is configured for electrical switching of the modulating elements. In FIG. 45, an electrical signal generator 534 is configured to provide current pulses for switching the modulating element 508 of the waveguide coupling element 506. An electrical interconnector 532 in a metal layer transmits the generated current pules to a doped portion 536 of the waveguide coupling element through a pair of vias 530a and 530b. As described above, the electrical current pulse will give rise to Joule heating in the doped waveguide thereby affecting the state of the modulating element 508. In embodiments employing a resistive element for use as heater instead of a doped portion of the waveguide coupling element, the arrangement of the electrical signal generator, interconnector and vias may be substantially the same as that illustrated in FIG. 45, with the resistive element located adjacent or above the modulating element in a metal or polysilicon layer, for example.

It will be appreciated that the device described with reference to FIGS. 43 to 45 is extendable to arbitrarily large matrix and vector dimensions. In this manner a scalable architecture for performing matrix-vector multiplications in the optical domain is provided.

Digital to Analogue Conversion

Figure 26:
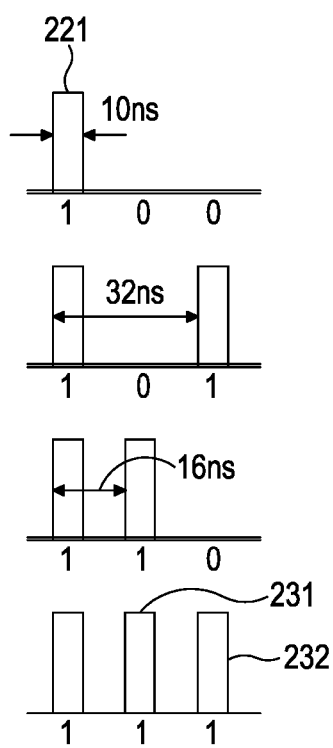
FIG. 26 is a schematic illustration of a timing signal and each permutation of a 2 bit digital signal.

Devices like that of FIG. 1 can be used to realise a digital to analogue conversion. FIG. 26 illustrates one way in which this can be achieved, based on the time sensitivity of the modulating element. A timing pulse 221 is provided before the digital word to be converted. The temporal proximity to the timing pulse weights the amount of state adjustment (e.g. amorphization from an initial crystalline state) caused by the subsequent write pulses. The most significant bit 231 results in a greater degree of amorphization because the preceding timing pulse has already warmed the modulating element. The time gap between the timing pulse 221 and the least significant bit means that it results in a smaller amount of state change (compared to the most significant bit on its own).

For devices like those already described, it was found that pulses of 10 ns, separated by 16 ns (between leading edges) result in clearly distinguishable transmission levels (determined with reference to the output power of a CW read signal through the waveguide).

Figure 27:
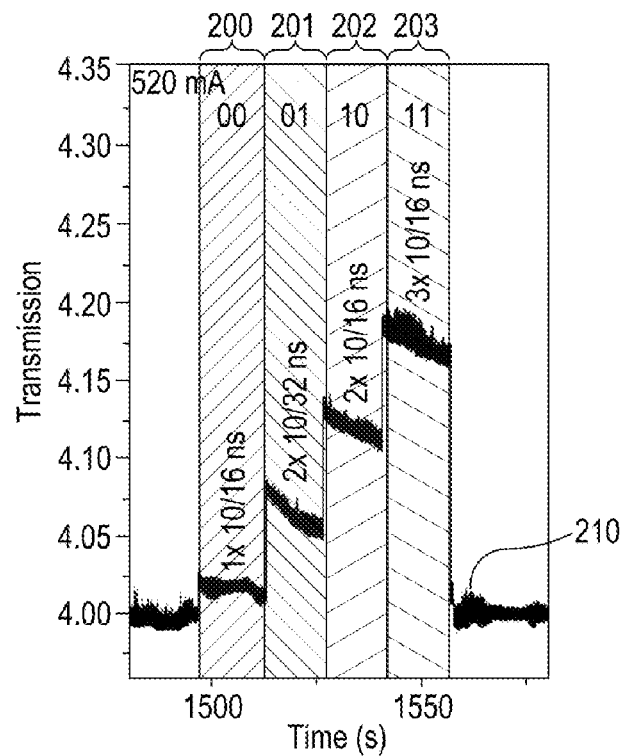
FIGS. 27, 28 and 29 show the transmission levels resulting from each of the permutations shown in FIG. 26, for a 520, 525 and 530 mA laser current respectively.
Figure 28:
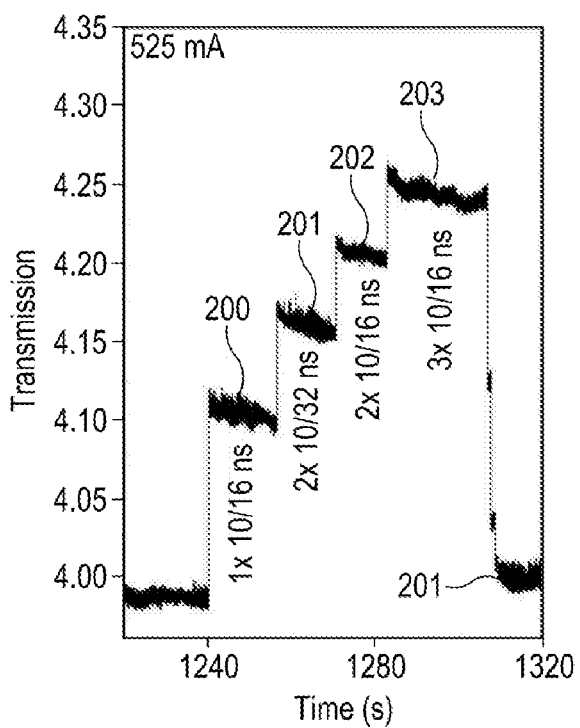
Figure 29:
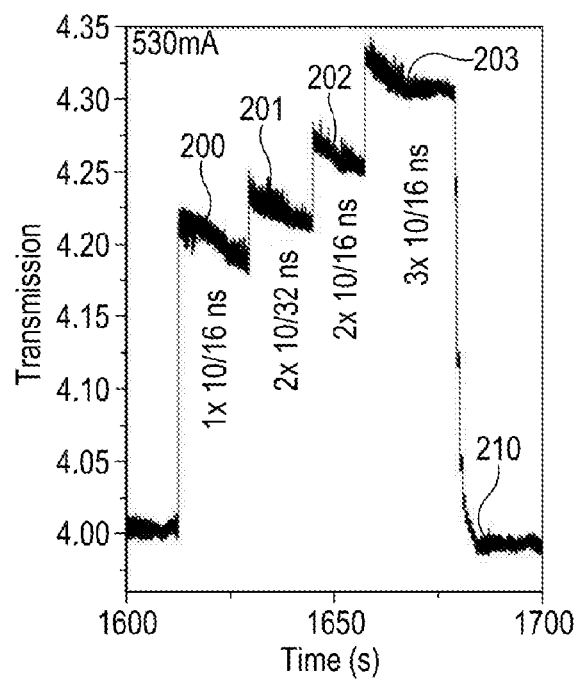

FIG. 27 shows the transmission levels for a laser current of 520 mA that result from: 200 the timing pulse alone, 201 the timing pulse and a 01 sequence, 202 the timing pulse and a 10 sequence, and 203 the timing pulse and a 11 sequence. The transmittance levels are a good match for the analogue numbers 0, 1, 2, and 3. FIG. 28 and FIG. 29 respectively show similar results for a laser current of 525 mA and 530 mA respectively.

Tuneable Volatility

The examples given previously assume that the read signal (which may be a pulse or CW signal) is sufficiently low power that it does not affect the state of the modulating element 102, but this is not necessarily the case.

In emerging applications, particularly photonic and neuromorphic computing, it may be desirable to have both volatile (short-term transient) and non-volatile (long-term static) memory operation, for example to mimic the behaviour of biological neurons and synapses. Phase change materials, particularly chalcogenides, perovskites, and metal oxides have enabled recent demonstrations of reflective displays, all-photonic memory, and tunable metamaterials. The operation of a single class of materials in both a volatile or non-volatile manner has not been demonstrated in the prior art, not just in the photonic domain, but even in the electronic domain.

Control of the optical properties of photonic devices has been demonstrated by employing materials such as chalcogenides, metal oxides, and even silicon itself. Non-volatile, reversible switching enabled by phase-change materials (PCMs) is the basis of technologies like re-writable optical discs, reflective displays, and tunable metasurfaces. Such switching relies on initiating a physical reconfiguration of the atomic structure (e.g. an amorphous to crystalline transition), which in turn results in a significant change of the optical properties. Volatile photonic devices have been achieved by using volatile metal oxides such as $VO_2$, which offers a semiconducting-to-metal phase transition around 66° C. with a pronounced change in optical properties. While materials like $VO_2$ are good candidates for volatile reconfigurable photonics, a device that can be selectively operated in both a volatile and non-volatile manner is more desirable. A single device displaying both behaviours and operated under the right conditions could be simultaneously used for data storage and for computing—essentially having the ability to mimic mammalian brains which requires both short-term plasticity (STP) and long-term potentiation (LTP).

It is understood that LTP is essential for long term memory while STP is necessary for temporal processing of information such as filtering and correlation detection. Storage and computation have been achieved in the electrical domain using PCM memory cells in an artificial neural network by mimicking leaky "integrate-and-fire" neurons.

In this disclosure it is shown that a device of the type described with reference to FIG. 1, with a modulating element coupled to an optical waveguide, can also be configured to display tuneable volatility by using a higher power optical read signal. Both non-volatile multilevel storage and volatile computation correlation detection in a single, integrated photonic device can thereby be achieved.

One example of a suitable device comprises a modulating element 102 that is 1 μm long ($L_{GST}$ in FIG. 1), comprising of GST capped by a 10 nm layer of Indium-Tin-Oxide (ITO). The modulating element 102 is disposed on top of a $Si_3N_4$ photonic waveguide 101 (as shown schematically in FIG. 1). The ITO capping layer passivates the GST and prevents oxidation.

Figure 30:
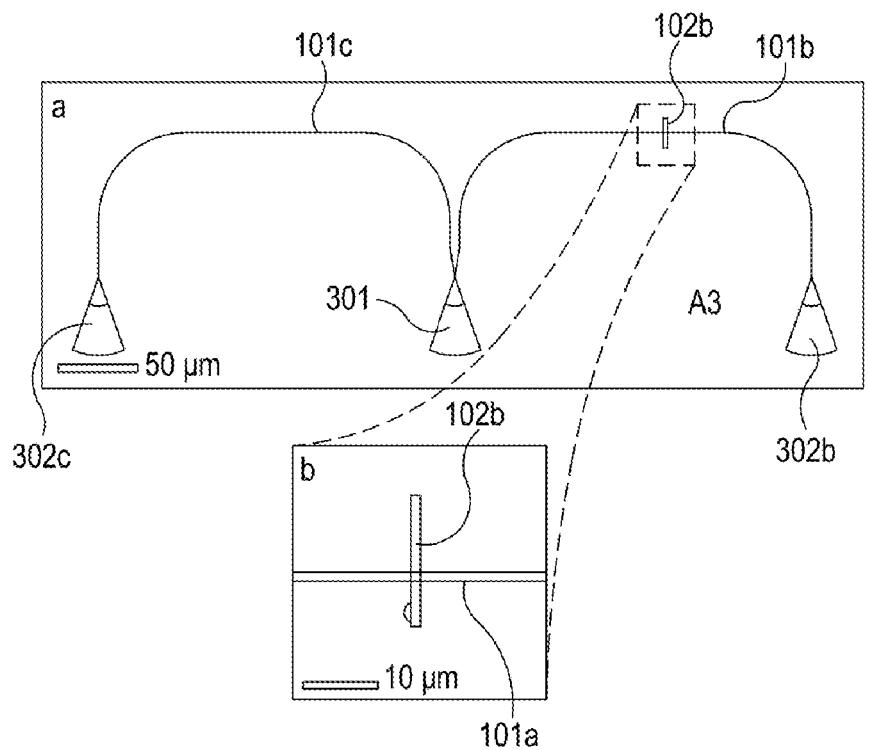
FIG. 30 shows an example device comprising a waveguide with a modulating element and a reference waveguide (without a modulating element), the waveguides having a common input grating coupler.

FIG. 30 illustrates a device with a first and second waveguide 101b, 101c. The first waveguide 101b has a modulating element 102b disposed thereon, and is configured so that light propagating in the first waveguide 101b is optically coupled to the modulating element 102b (as already described above). The second waveguide 101c is a reference waveguide, and does not include a modulating element. A centre input grating 301 is provided, that splits input light into the two waveguides 101b, 101c.

The second reference waveguide 101c allows determination of the total transmission of the first waveguide 101b and two grating couplers (either 301 and 302b or 302 and 302c) without absorption loss from the modulating element 102b. FIG. 24 includes an inset magnified optical image of the modulating element 102b (in the form of a GST strip transverse to the $Si_3N_4$ waveguide 101a). In order to optimize the interaction between the optical mode and the modulating element 102b, the sample device was annealed at 250° C. for 10 minutes to crystallize the GST of the modulating element 102, which increases optical absorption. Optical pulses (e.g. of 50 ns or less), can be used to switch the material between its amorphous (low absorption) and crystalline (high absorption) states (as already discussed herein at length).

Figure 31:
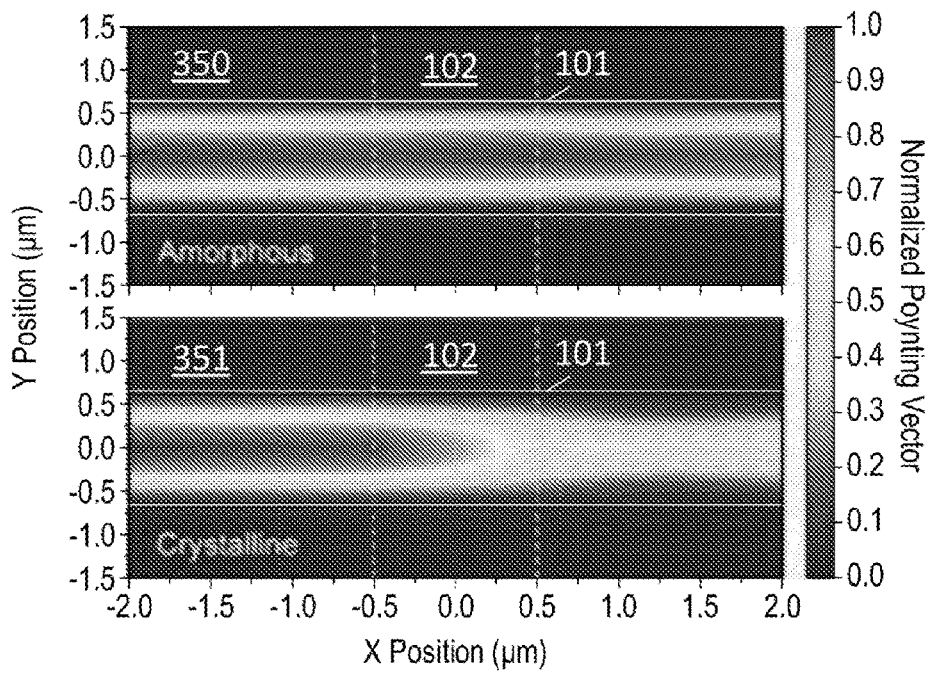
FIG. 31 shows the results of a simulation, plotting the magnitude of the Poynting vector as a shading map over the waveguide with the modulating element in an amorphous and a crystalline state.

FIG. 31 shows results obtained by finite difference time domain (FDTD) simulations calculating the optical transmission through the waveguide 101 when the modulating element/GST strip 101 is in the amorphous and crystalline states. FIG. 31 shows a top-down view of the power flow in the x-direction through the waveguide 101 (edges defined by solid lines) in the region of the GST strip (edges defined by dashed lines). The magnitude of the normalised Poynting vector is represented by the shading.

The resulting transmission for amorphous and crystalline GST is 96.2% and 46.5% respectively. While this would ideally give over 100% relative change in transmission, in reality it is not possible with the example embodiment used for proof of principle herein to amorphize the entire region of GST within reach of the optical mode due to the non-uniform mode profile in the transverse direction. This causes the centre of the modulating element/GST 102 to be amorphized in the regions where the material temperature exceeds the melting temperature ($T_m$). Increasing the optical power in the waveguide 101 will increase the area that is amorphized, but if the temperature at the centre of the GST/modulating element 102 exceeds the damage threshold, the material may undergo a non-reversible change (e.g. ablation). This limits the maximum attainable change in relative transmission to about 20% in 1 μm long devices ($L_{GST}$ in FIG. 1), but greater contrast can be achieved with devices with wider strips of GST (i.e. a longer modulating element, measured in the direction of propagation).

Figure 32:
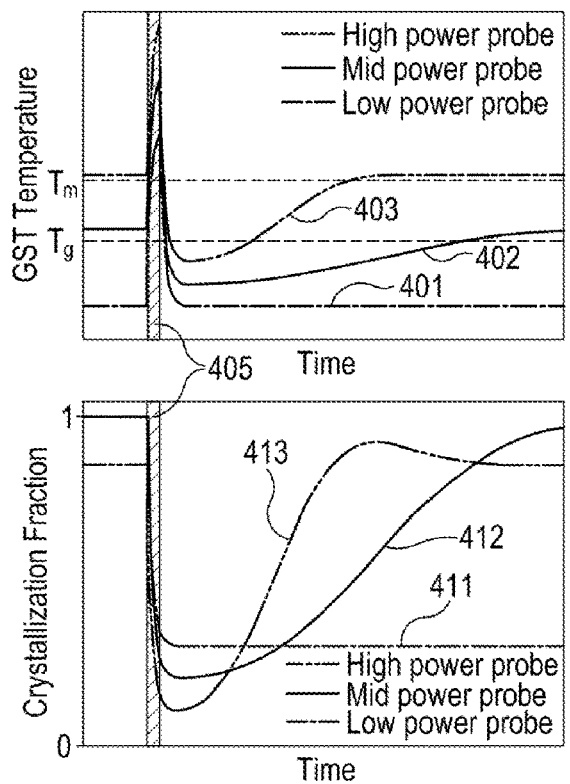
FIG. 32 is a pair of graphs showing (top) the evolution of temperature over time after a write pulse for a low, medium and high level read signal; and (bottom) the corresponding crystallization fraction over time.

FIG. 32 illustrates the thermal dynamics of the GST starting from the crystalline state. A first graph (top) shows the evolution of temperature of the modulating element 102 over time, and a second graph shows the corresponding crystallization fraction, with 1 representing a crystalline state. Curves corresponding with a low power read signal 401, 411, a medium power read signal 402, 412 and a high power read signal 403, 413 are shown. Each curve 401-403 and 411-413 illustrates the response of the modulating element following a write pulse (region 405 in FIG. 26). The write pulse encounters crystalline GST, and is at least partially absorbed, which quickly raises the temperature of the material. If the pulse energy is high enough, the temperature of the GST will exceed $T_m$ during the pulse duration and quickly quench below the glass transition temperature ($T_g$), leaving the GST in the affected region in the amorphous state.

If an optical read signal (or probe signal) is used to read out the state of the material, some of the read signal will be also absorbed and converted into heat, depending on the transmission of the GST modulating element 102. For low-power probes, it is possible to read the transmission state of the modulating element 102 in a manner that does not influence the physical state of the material—this corresponds with trances 401 and 411—a low power read signal. This method of reading results in non-volatile memory effect which has been previously reported, useful for storing long-term data with a retention time of more than 10 years.

For a mid-power read signal/probe, however, the absorbed optical power can heat the GST near or above $T_g$ which causes recrystallization to occur after the initial write pulse 405, as shown in traces 402, 412. The modulating element here starts at an elevated temperature due to the heating resulting from the CW read signal. with a continuously applied read signal of moderate power the state of the modulating element 102 is volatile with a retention time that is non-linearly dependant on both the power of the read signal and the transmission state of the GST modulating element 102 after the write signal/pulse. High read signal powers tend to result in a more rapid return to the crystalline state. If the power of the read signal is further increased (as shown in the traces 403 and 413), the temperature of the GST can approach $T_m$ during the steady state. With a high read signal, the initial crystallization fraction may be less than 1 due to the heating effect of the read signal.

Figure 33:
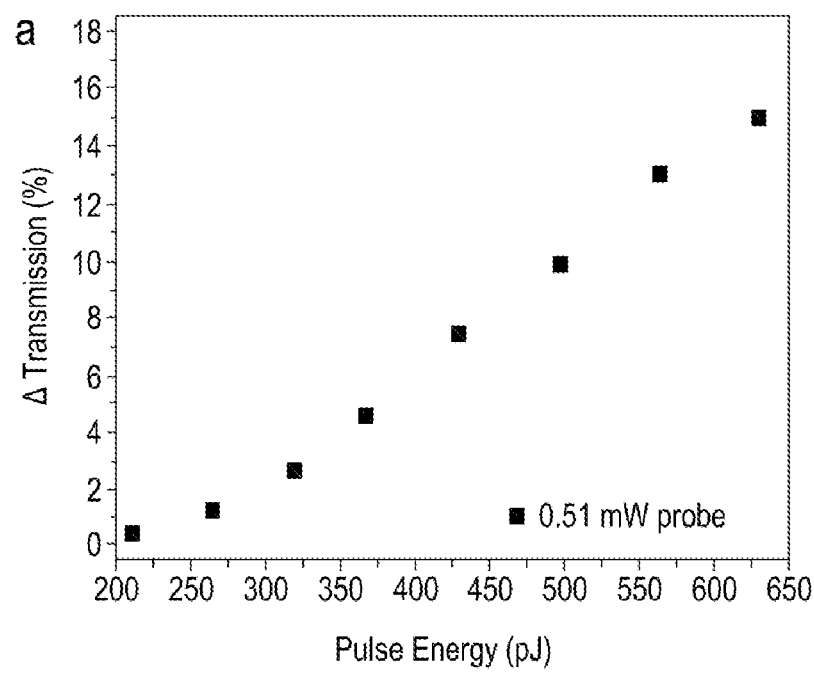
FIG. 33 is a graph showing the relationship between write signal pulse energy and change in transmission.
Figure 34:
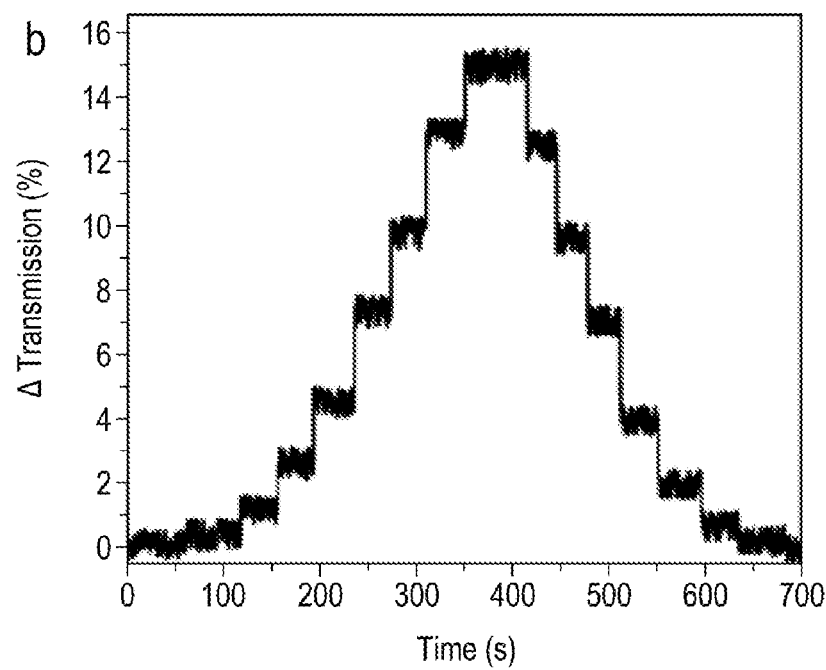
FIG. 34 is a graph showing 9 programmed levels, using a low power read signal for non-volatile operation.

In order to demonstrate both the volatile and non-volatile behaviour of an example device, multiple transmission levels were defined by varying the write pulse energy for a fixed pulse duration of 50 ns. FIG. 33 shows the effect of such write signals on a GST modulating element that starts in the crystalline state. Eight clear transmission levels are shown, plus a baseline with no write pulse (i.e. ΔT=0%), corresponding to a memory cell with 9 unique levels. A low-power read signal ($P_{read}$=510 μW after the initial grating coupler 301) was used to monitor the state of the GST modulating element 102 in real time. FIG. 34 shows non-volatile levels corresponding with each write pulse energy. Retention times greater than $10^6$ s have been demonstrated in similar devices, and material studies of GST memory cells have estimated retention times to exceed 10 years. The number of attainable levels is ultimately limited by the signal-to-noise ratio of the optical read-out and by how reliably the write signal pulse energy can be controlled.

Figure 35:
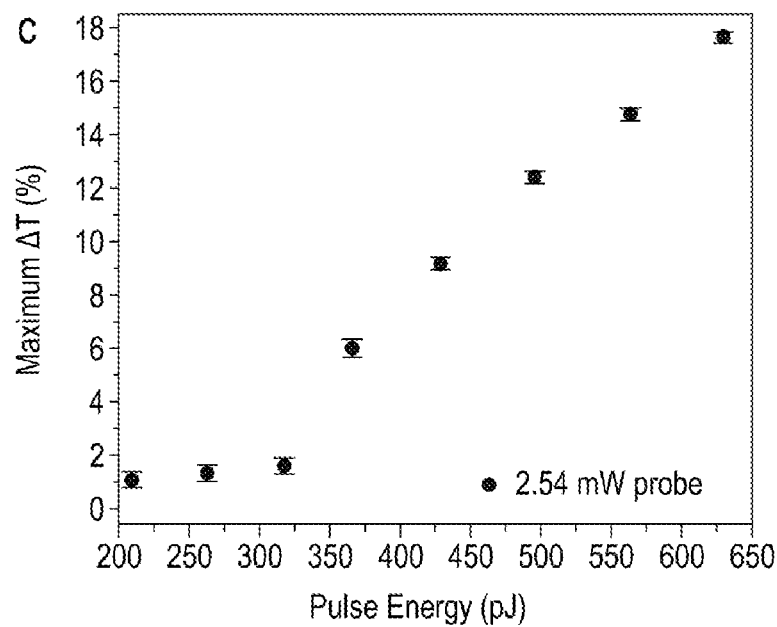
FIG. 35 is a graph showing the relationship between a maximum change in transmission against write signal pulse energy for a high power read signal.
Figure 36:
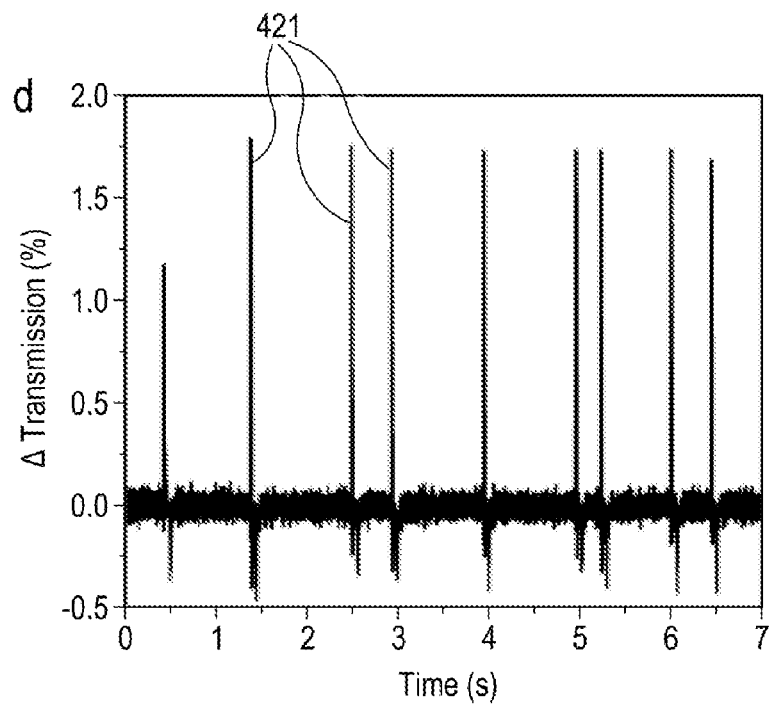
FIG. 36 is a graph illustrating volatile operation using a high power read signal, in which each write pulse results in a short duration (or spike) of amorphization, which is soon recrystallized by the read signal.

Volatile behaviour is produced by increasing the probe power to 2.54 mW and sending 50 ns write signals with the same pulse energies as before. FIG. 35 shows a similar trend to FIG. 33, but a noticeable threshold is observed around a pulse energy of 275 pJ (corresponding with a switching energy of 47.9 pJ). This is likely due to partial amorphization melting of the GST modulating element 102 by the relatively high-power read signal, which lowers the optical absorption and reduces the effect of the write pulse below a certain energy. FIG. 36 shows a similar real-time trace of the read probe to that shown in FIG. 34, but with volatile spiking behaviour due to the recrystallization of the GST from the high-power read signal. At each write pulse, the transmission is briefly increased by the material of the modulating element being amorphized, but the relatively high-power read signal returns the modulating element to a crystalline state shortly after each spike 421 in optical transmission is recorded.

Figure 37:
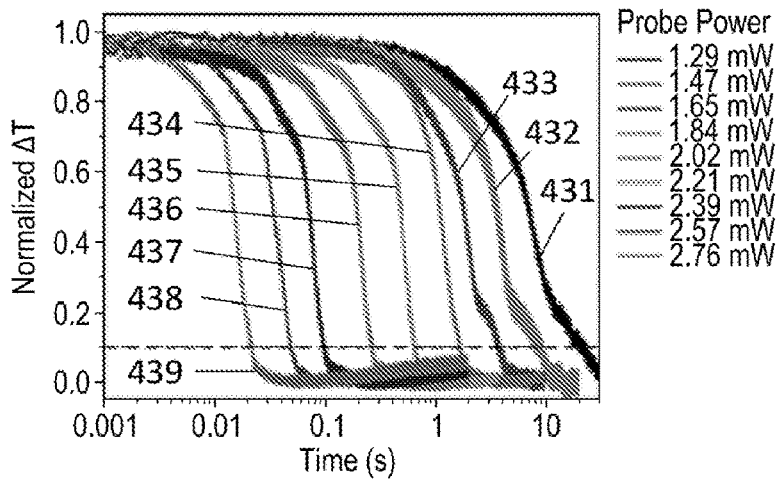
FIG. 37 is a plot of the (log scale) time dependant transmission for a device after an initial write pulse to put the material into an amorphous state, with traces for a range of read signal powers.

In order to further determine the role of read signal power on the recrystallization dynamics of the example device, the write signal pulse energy may be fixed while varying the read signal power. FIG. 37 plots the normalized time-dependant transmission of the example device in log scale at various read signal powers. Curves 431 to 439 correspond with powers of 1.29, 1.47 1.65, 1.84, 2.02, 2.21, 2.39, 2.57 and 2.76 mA respectively. As before, $\Delta T=(T-T_{min})/T_{min}$ where $T_{min}$ is the transmission of the read signal when the device is in the fully crystalline state. After the initial write pulse at 0 seconds, the GST modulating element 102 is in the amorphous sate, ΔT is maximum, and the temperature is at a minimum due to low optical absorption. However, a portion of the read signal is still absorbed by the modulating element 102 which heats the GST material and causes crystal growth to occur at a rate dependant on the material temperature.

As GST crystallizes, the optical absorption of the read signal increases and a positive-feedback loop drives the material back to its crystalline state. If the read signal power is high enough to cause partial melting, the steady state temperature $T_{steady\ state}$ will be greater than $T_{min}$ when the GST is fully crystallized. This causes ΔT>0 at steady state, and this can be observed in FIG. 37 for probe powers greater than 1.84 mW (i.e. curves 435 to 439). Once the material fully crystallizes, the absorption of the read signal is at a maximum and the read signal partially re-melts the GST until thermal equilibrium is achieved at $T_{steady\ state}$ and ΔT>0.

A clear trend is observed in the recovery time of the material which we have defined as the amount of time required for ΔT to equal 10% of $\Delta T_{max}$ (represented by the dashed line FIG. 37).

Figure 38:
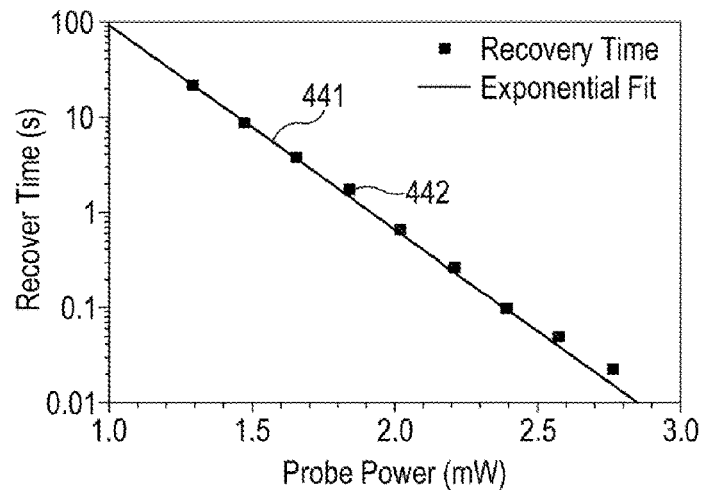
FIG. 38 is a plot showing the relationship between recovery time and read signal/probe power.

FIG. 38 shows a plot of the recovery time τ as a function of read signal power, showing measurements 442 and a fit 441 to the data in the form of an exponential $\tau(P)=Ae^{-\gamma P}$ where A and γ are fitting parameters and P is the read signal power. These results show optical control of the data retention time by over six orders of magnitude.

Figure 39:
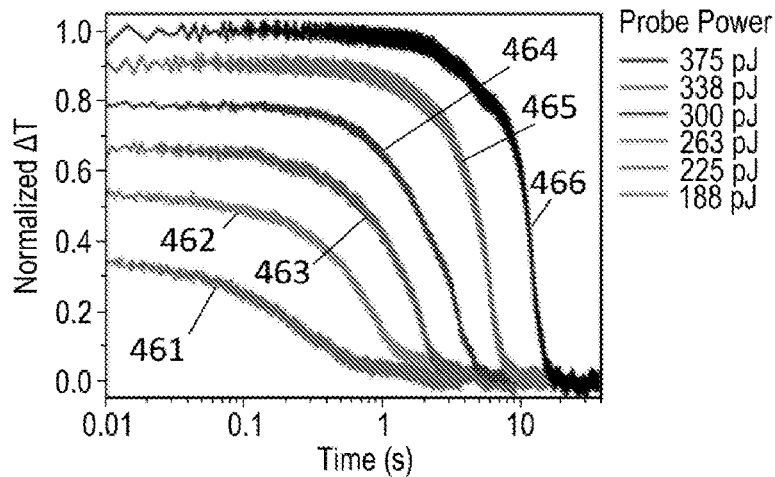
FIG. 39 is a plot of the (linear scale) time dependant transmission for a device after an initial write pulse to put the material into an amorphous state, with traces for a range of read signal powers.

In order to illustrate the influence of the write pulse on the recovery time of the example device, the read signal power may be fixed and the write pulse energy varied. FIG. 39 shows the results of testing in this way. Both the maximum transmission and recovery time decrease with decreasing write pulse energy. This may be explained by the difference in optical absorption for a partially amorphized versus fully amorphized modulating element. The lower the write pulse energy, the higher the fraction of GST remaining in the crystalline state, leading to higher absorption and a faster recovery time. This trend is clearly seen in FIG. 39 where both the recovery time and peak transmission decrease with decreasing write pulse energy.

The ability to operate optical waveguides comprising optically controlled modulating elements in a non-volatile manner may enable computation, using the non-linear nature of the phase-change transition.

Figure 40:
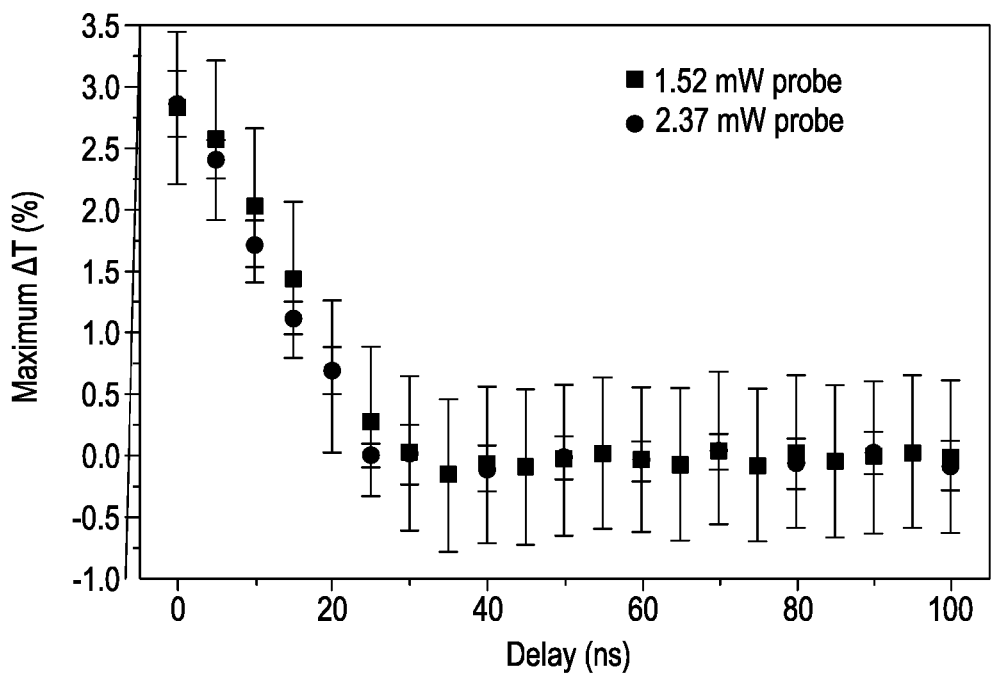
FIG. 40 is a graph showing the relationship between a maximum change in transmission and the time delay between a pair of sub-threshold write pulses, with a trace for a read signal power of 1.52 mW and a read signal power of 2.37 mW.

FIG. 40 is a plot of the peak response of an example device for a mid- and high-power probe when two 50 ns write pulses, separated by various time delays, are coincident at the modulating element. Delays of less than around 40 ns result in a change in transmission, due to an overlap in power leading to heating beyond a threshold amorphization temperature, whereas delays greater than this result in no change in transmission.

Figure 41:
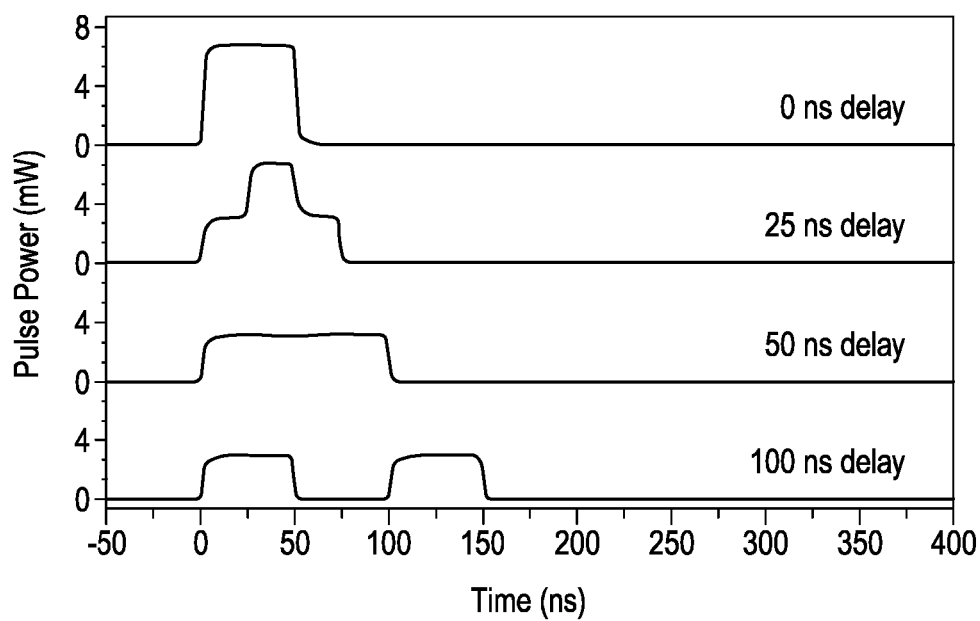
FIG. 41 is a graph of measured output optical power (of the read signal after transmission through the waveguide) over time for four different sets of write pulses, corresponding with: no delay, 25 ns delay, 50 ns delay and 100 ns delay.

FIG. 41 shows the measured optical power of four individual write pulses with different time delays. If we integrate the optical power, we see that regardless of the time delay between the two write pulses, the total energy remains constant at $E_{pulses}$=340±17 pJ (switching energy of 59±3 pJ). However, the peak power of the combined two write pulses does vary with increasing time delay. When the device is operated in a regime where the peak power of a single write pulse is close to, but below, the threshold needed to amorphize the GST, no response occurs. However, by overlapping two write pulses, the peak power doubles and is able to cause amorphization which results in an increase in transmission. This non-linear response allows us to calculate the correlation between two optical pulses using the device's transmission.

Figure 42:
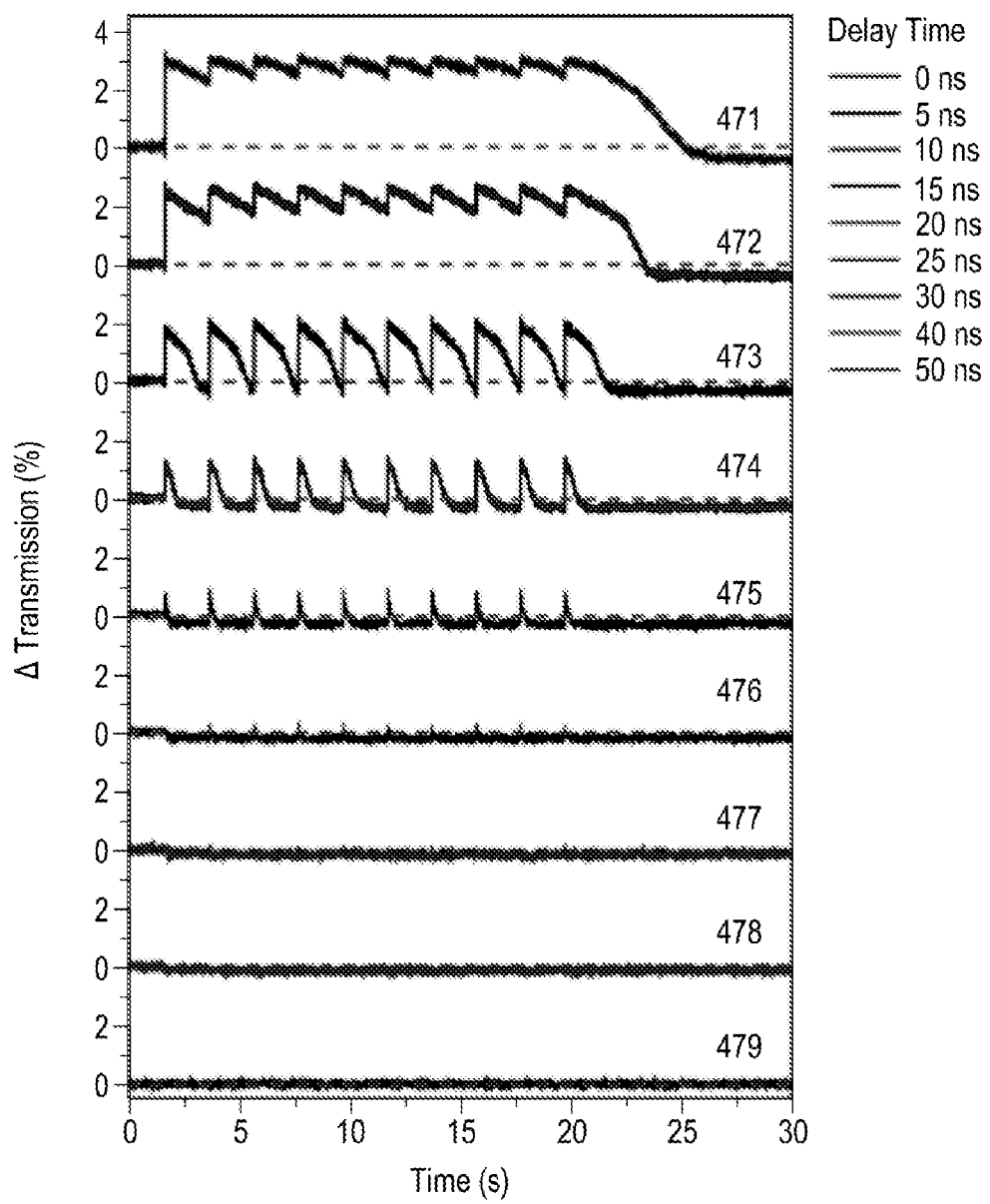
FIG. 42 is a graph showing plots of the change in transmission over time for pulse trains with varying amounts of relative delay.

FIG. 42 illustrates this, showing transmission traces 471 to 479 for pulse trains with different time separation. Each pulse train comprised ten 50 ns write pulses with a 500 Hz repetition rate, and the separation between the pulse trains varied from 0 ns to 50 ns in 5 ns increments (trace 471 corresponding with 0 ns delay, and 472 with 5 ns, etc). Although in practice the repetition rate could be much higher, it is instructive to see the response of the example device between individual write pulses in the pulse train.

By varying the time delay between the two pulse trains, we see the temporal response of our device change. At no time delay (trace 471), the transmission remains almost constant throughout the duration of the pulse train with small visible spikes in the transmission where the overlapping write pulses occur. As the time delay between the two pulse trains increases, the amplitude and duration of the transmission spikes decrease until they are no longer overlapping (trace 473, 10 ns delay). As the time delay increases further (trace 477, 30 ns), the transmission response disappears indicating the two pulse trains are no longer correlated in time. This ability to detect correlated events between multiple inputs is known to occur in biological neurons and has broad significance for training neural networks and quantifying correlation between stochastic signals in machine learning applications.

Although the response times shown in FIGS. 37 to 39 are rather long compared with the time scale of the write pulses, it is still possible to clearly resolve a 5 ns difference in time delay between two write pulses due to the high speed melting process by which GST is amorphized with an optical pulse (as seen in the results of FIG. 42, for example).

Both volatile and non-volatile behaviour are possible in accordance with this disclosure, demonstrating that the best of both worlds can be attained with a single element. By varying the optical power of the read signal, an exponential decrease in the data retention time of the modulating element is observed, enabling retention times ranging from years (i.e. non-volatile) to milliseconds (i.e. volatile). These two modes of operation are achieved in an optical platform capable of multilevel data storage and computing pulse correlation. By operating devices in a volatile manner, timing differences as low as 5 ns between two pulses can be resolved. Similar behaviour occurs between two trains of multiple pulses, indicating volatile photonics memory elements of the type disclosed herein could be used to calculate the correlation between two optical signals. These results demonstrate that photonics utilizing non-volatile elements can also be configured as volatile elements and thus provide a promising platform for all-optical data storage and computation.

The above examples are not intended to limit the scope of the invention, which should be determined with reference to the appended claims.

REFERENCES

1. Sun, C. et al. Single-chip microprocessor that communicates directly using light. Nature 528, 534-538 (2015).
2. Vandoorne, K. et al. Experimental demonstration of reservoir computing on a silicon photonics chip. Nat. Commun. 5, 1-6 (2014).
3. Shainline, J. M., Buckley, S. M., Mirin, R. P. & Nam, S. W. Superconducting Optoelectronic Circuits for Neuromorphic Computing. Phys. Rev. Appl. 7, 1-27 (2017).
4. Shen, Y. et al. Deep Learning with Coherent Nanophotonic Circuits. Nat. Photonics 11, 441-447 (2017).
5. Kielpinski, D. et al. Information processing with large-scale optical integrated circuits. 2016 IEEE Int. Conf. Rebooting Comput. ICRC 2016-Conf. Proc. (2016). doi: 10.1109/ICRC.2016.7738704
6. Lee, B. et al. Silicon Photonic Switch Fabrics in Computer Communications Systems. J. Light. Technol. 8724, 1-1 (2014).
7. Wuttig, M., Bhaskaran, H. & Taubner, T. Phase-change materials for non-volatile photonic applications. Nat. Photonics 11, 465-476 (2017).
8. Ikuma, Y. et al. Small-sized optical gate switch using Ge2Sb2Te5 phase-change material integrated with silicon waveguide. Electron. Lett. 46, 368 (2010).
9. Kato, K., Kuwahara, M., Kawashima, H., Tsuruoka, T. & Tsuda, H. Current-driven phase-change optical gate switch using indium-tin-oxide heater. Appl. Phys. Express 10, (2017).
10. Stegmaier, M., Rlos, C., Bhaskaran, H., Wright, C. D. & Pernice, W. H. P. Nonvolatile All-Optical 1X2 Switch for Chipscale Photonic Networks. Adv. Opt. Mater. 5, 2-7 (2017).
11. Rudé, M. et al. Optical switching at 1.55 µm in silicon racetrack resonators using phase change materials. Appl. Phys. Lett. 103, 141119 (2013).
12. Lu, Y. et al. Mixed-mode operation of hybrid phase-change nanophotonic circuits. Nano Lett. 17, 150-155 (2017).
13. Pernice, W. H. P. & Bhaskaran, H. Photonic non-volatile memories using phase change materials. App. Phys. Lett. 101, 171101 (2012).

14. Ríos, C., Hosseini, P., Wright, C. D., Bhaskaran, H. & Pernice, W. H. P. On-chip photonic memory elements employing phase-change materials. Adv. Mater. 26, 1372-1377 (2014).
15. Ríos, C. et al. Integrated all-photonic non-volatile multi-level memory. Nat. Photonics 9, 725-732 (2015).
16. Caulfield, H. J. & Dolev, S. Why future supercomputing requires optics. Nat. Photonics 4, 261-263 (2010).
17. Gallo, M. Le et al. Mixed-Precision 'Memcomputing'. ArXiv preprint, arXiv: 1701.04279 (2017).
18. Sheridan, P. M. et al. Sparse coding with memristor networks. Nat. Nanotechnol. 12, 784-789 (2017).
19. Seshadri, V. et al. Buddy-RAM: Improving the Performance and Efficiency of Bulk Bitwise Operations Using DRAM. ArXiv preprint, arXiv:1611.09988 (2016).
20. Sebastian, A. et al. Temporal correlation detection using computational phase-change memory. ArXiv preprint, arXiv:1706.00511 (2017).
21. Di Ventra, M. & Pershin, Y. V. The parallel approach. Nat. Phys. 9, 200-202 (2013).
22. Traversa, F. L. & Di Ventra, M. Universal Memcomputing Machines. IEEE Trans. Neural Networks Learn. Syst. 26, 2702-2715 (2015).
23. Hu, M. et al. Dot-Product Engine for Neuromorphic Computing: Programming 1T1M Crossbar to Accelerate Matrix-Vector Multiplication. Des. Autom. Conf. (DAC), 2016 53nd ACM/EDAC/IEEE 1-6 (2016).
24. Wuttig, M. & Yamada, N. Phase-change materials for rewriteable data storage. Nat. Mater. 6, 824-32 (2007).
25. Kuramochi, E. & Notomi, M. Optical memory: Phase-change memory. Nat. Photonics 9, 712-714 (2015).
26. Wright, C. D., Liu, Y., Kohary, K. I., Aziz, M. M. & Hicken, R. J. Arithmetic and biologically-inspired computing using phase-change materials. Adv. Mater. 23, 3408-13 (2011).
27. Wright, C. D., Hosseini, P. & Diosdado, J. a. V. Beyond von-Neumann Computing with Nanoscale Phase-Change Memory Devices. Adv. Funct. Mater. 23, 2248-2254 (2013).
28. Hosseini, P., Sebastian, A., Papandreou, N., Wright, D. & Bhaskaran, H. Accumulation-based computing using phase-change memories with FET access devices. Electron Device Letters, IEEE (2015). doi:10.1109/LED.2015.2457243
29. Stegmaier, M., Ríos, C., Bhaskaran, H. & Pernice, W. H. P. Thermo-optical Effect in Phase-Change Nanophotonics. ACS Photonics 3, 828-835 (2016).
30. Waldecker, L. et al. Time-domain separation of optical properties from structural transitions in resonantly bonded materials. Nat. Mater. 14, 1-6 (2015).
31. Loke, D. et al. Breaking the speed limits of phase-change memory. Science 336, 1566-9 (2012).
32. Sebastian, A., Krebs, D., Le Gallo, M., Pozidis, H. & Eleftheriou, E. A collective relaxation model for resistance drift in phase change memory cells. IEEE Int. Reliab. Phys. Symp. Proc. 2015-May, MY51-MY56 (2015).
33. Ielmini, D., Lacaita, A. L. & Mantegazza, D. Recovery and drift dynamics of resistance and threshold voltages in phase-change memories. IEEE Trans. Electron Devices 54, 308-315 (2007).
34. Karpov, I. V. et al. Fundamental drift of parameters in chalcogenide phase change memory. J. Appl. Phys. 102, (2007).
35. Fantini, P., Brazzelli, S., Cazzini, E. & Mani, A. Band gap widening with time induced by structural relaxation in amorphous Ge 2Sb 2Te 5 films. Appl. Phys. Lett. 100, (2012).
36. Saad, Y. Iterative methods for sparse linear systems. (Society for Industrial and Applied Mathematics, 2003).
37. Burr, G. W. et al. Experimental demonstration and tolerancing of a large-scale neural network (165,000 synapses), using phase-change memory as the synaptic weight element. IEEE Trans. Electron Devices 62, 3498-3507 (2015).
38. B. J. Eggleton, B. Luther-Davies, K. Richardson, Nat. Photonics 2011, 5, 141.
39. C. Ríos, M. Stegmaier, P. Hosseini, D. Wang, T. Scherer, C. D. Wright, H. Bhaskaran, W. H. P. Pernice, Nat. Photonics 2015, 9, 725.
40. R. M. Briggs, I. M. Pryce, H. A. Atwater, Opt. Express 2010, 18, 11192.
41. J. D. Ryckman, K. A. Hallman, R. E. Marvel, R. F. Haglund, S. M. Weiss, Opt. Express 2013, 21, 10753.
42. G. Kaplan, K. Aydin, J. Scheuer, Opt. Mater. Express 2015, 5, 2513.
43. O. L. Muskens, L. Bergamini, Y. Wang, J. M. Gaskell, N. Zabala, C. de Groot, D. W. Sheel, J. Aizpurua, Light Sci. Appl. 2016, 5, e16173.
44. Y. Abate, R. E. Marvel, J. I. Ziegler, S. Gamage, M. H. Javani, M. I. Stockman, R. F. Haglund, Sci. Rep. 2015, 5, 13997.
45. R. Bruck, K. Vynck, P. Lalanne, B. Mills, D. J. Thomson, G. Z. Mashanovich, G. T. Reed, O. L. Muskens, Optica 2016, 3, 396.
46. N. Yamada, E. Ohno, K. Nishiuchi, N. Akahira, M. Takao, J. Appl. Phys. 1991, 69, 2849.
47. C. Ríos, P. Hosseini, R. A. Taylor, H. Bhaskaran, Adv. Mater. 2016, 28, 4720.
48. P. Hosseini, C. D. Wright, H. Bhaskaran, Nature 2014, 511, 206.
49. B. Broughton, L. Bandhu, C. Talagrand, S. Garcia-Castillo, M. Yang, H. Bhaskaran, P. Hosseini, SID Symp. Dig. Tech. Pap. 2017, 48, 546.
50. T. Cao, C. Wei, R. E. Simpson, L. Zhang, M. J. Cryan, Sci. Rep. 2015, 4, 3955.
51. B. Gholipour, J. Zhang, K. F. MacDonald, D. W. Hewak, N. I. Zheludev, Adv. Mater. 2013, 25, 3050.
52. Q. Wang, E. T. F. Rogers, B. Gholipour, C.-M. Wang, G. Yuan, J. Teng, N. I. Zheludev, Nat. Photonics 2015, 10, 60.
54. T. V. P. Bliss, G. L. Collingridge, Nature 1993, 361, 31.
55. H. Markram, Y. Wang, M. Tsodyks, Proc. Natl. Acad. Sci. 1998, 95, 5323.
56. S. J. Martin, P. D. Grimwood, R. G. M. Morris, Annu. Rev. Neurosci. 2000, 23, 649.
57. M. A. LYNCH, Physiol. Rev. 2004, 84, 87.
58. T. Natschläger, W. Maass, A. Zador, Network 2001, 12, 75.
59. R. Gütig, H. Sompolinsky, Nat. Neurosci. 2006, 9, 420.
60. T. Tuma, A. Pantazi, M. Le Gallo, A. Sebastian, E. Eleftheriou, Nat. Nanotechnol. 2016, 11, 693.
61. T. Tuma, M. Le Gallo, A. Sebastian, E. Eleftheriou, IEEE Electron Device Lett. 2016, 37, 1238.
62. R. Berdan, E. Vasilaki, A. Khiat, G. Indiveri, A. Serb, T. Prodromakis, Sci. Rep. 2016, 6, 18639.
63. S.-H. Lee, Y. Jung, R. Agarwal, Nat. Nanotechnol. 2007, 2, 626.
64. A. Sebastian, M. Le Gallo, D. Krebs, Nat. Commun. 2014, 5, DOI 10.1038/ncomms5314.

65. M. Salinga, E. Carria, A. Kaldenbach, M. Bornhöfft, J. Benke, J. Mayer, M. Wuttig, Nat. Commun. 2013, 4, DOI 10.1038/ncomms3371.
66. I. Friedrich, V. Weidenhof, W. Njoroge, P. Franz, M. Wuttig, J. Appl. Phys. 2000, 87, 12 4130.
67. S. E. Fahlman, C. Lebiere, in Adv. Neural Inf. Process. Syst. 2, 1990, pp. 524-532.

The invention claimed is:

1. A method of performing a multiplication operation in the optical domain using a device comprising:
    an optical waveguide, and a modulating element that is optically coupled to the optical waveguide, the modulating element modifying a transmission, reflection or absorption characteristic of the waveguide dependant on its state, wherein the state of the modulating element is adjustable by a write signal;
    wherein the method comprises the following steps:
    encoding a first value to the write signal,
    using the write signal to map the first value to a state of the modulating element;
    encoding a second value to a read signal;
    producing an output signal intensity as the transmitted or reflected read signal, wherein the product of the first value and the second value is encoded in the output signal intensity; and
    applying a transmission offset correction to the output signal intensity by subtracting a transmission baseline from the output signal intensity.

2. The method of claim 1, wherein the modulating element is optically near-field coupled to the optical waveguide.

3. The method of claim 1, wherein determining the result comprises applying a scaling correction to the output intensity, and/or wherein the first value and the second value have at least three different possible levels.

4. The method of claim 1, wherein the modulating element comprises a phase change material.

5. The method of claim 4, wherein the write signal maps the value of the write signal to a degree of amorphization of the modulating element, and/or wherein the modulating element is placed in a baseline crystalline condition prior to using the write signal.

6. The method of claim 1, wherein there is a linear scaling between the first value and the product and between the second value and the product, and/or wherein the output pulse intensity is detected as the proportion of the read pulse that is transmitted, and/or wherein the read signal is an optical read pulse.

7. The method of claim 1, comprising determining a vector or matrix multiplication by performing more than one multiplication operation, wherein the output signal is produced by combining transmitted and/or reflected signals from more than one waveguide, and/or
    comprising using a device comprising more than one waveguide, each of the more than one waveguide comprising a corresponding modulating element, and/or
    wherein the device further comprises at least one optical combiner, each combiner configured to combine the output signal produced by more than one waveguide, and/or
    wherein the optical waveguide is a first optical waveguide, and the device further comprises a second waveguide, transverse to the first waveguide in the region of the modulating element, wherein the modulating element is optically coupled to both the first waveguide and the second waveguide.

8. The method of claim 1, wherein the state of the modulating element is adjustable by an optical signal carried by the waveguide and the step of using the write signal to map the first value to a state of the modulating element comprises transmitting the write signal through the waveguide.

9. The method of claim 8, wherein the write signal is an optical write pulse.

10. The method of claim 1, wherein the write signal is an electrical signal.

11. The method of claim 10, wherein the waveguide is doped and the electrical signal is applied to the doped waveguide, or
    wherein the electrical signal is applied to a resistive element proximate the modulating element.

12. The method according to claim 10, wherein the electrical signal is an electrical current pulse.

13. A method of performing a multiplication operation in the optical domain using a device comprising:
    an optical waveguide, and a modulating element that is optically coupled to the optical waveguide, the modulating element modifying a transmission, reflection or absorption characteristic of the waveguide dependant on its state, wherein the state of the modulating element is adjustable by a write signal;
    wherein the method comprises the following steps:
    encoding a first value to the write signal,
    using the write signal to map the first value to a state of the modulating element;
    encoding a second value to a read signal;
    producing an output signal intensity as the transmitted or reflected read signal, wherein the product of the first value and the second value is encoded in the output signal intensity;
    wherein the state of the modulating element is adjustable by an optical signal carried by the waveguide and the step of using the write signal to map the first value to a state of the modulating element comprises transmitting the write signal through the waveguide; and
    wherein the modulating element is placed in a baseline crystalline condition prior to using the write signal, and wherein placing the modulating element in a baseline crystalline condition comprises using a two-step reset pulse, the first step having a higher power and shorter duration than the second step, and with less than 5 ns delay between the first step and second step.

14. A method of performing a multiplication operation in the optical domain using a device comprising:
    an optical waveguide, and a modulating element that is optically coupled to the optical waveguide, the modulating element modifying a transmission, reflection or absorption characteristic of the waveguide dependant on its state, wherein the state of the modulating element is adjustable by a write signal;
    wherein the method comprises the following steps:
    encoding a first value to the write signal,
    using the write signal to map the first value to a state of the modulating element;
    encoding a second value to a read signal;
    producing an output signal intensity as the transmitted or reflected read signal, wherein the product of the first value and the second value is encoded in the output signal intensity;
    wherein the state of the modulating element is adjustable by an optical signal carried by the waveguide and the step of using the write signal to map the first value to a state of the modulating element comprises transmitting the write signal through the waveguide; and wherein the write signal is a first write signal that maps the first value to a state of a first region of the modulating element, and the method further comprises:

encoding a third value to a second write signal, and using the second write signal to map the third value to a state of a second region of the modulating element, wherein the output signal intensity encodes the product of the first, second and third values and/or the sum of the first value multiplied by the second value and the first value multiplied by the third value.

15. The method of claim 14, wherein the first and second write signal are propagated in different directions, and/or wherein the device comprises a first waveguide defining a read signal propagation direction, and at least one further waveguide for carrying write signals in a different direction to the direction of read signal propagation.

16. A method of performing a multiplication operation in the optical domain using a device comprising:

an optical waveguide, and a modulating element that is optically coupled to the optical waveguide, the modulating element modifying a transmission, reflection or absorption characteristic of the waveguide dependant on its state, wherein the state of the modulating element is adjustable by a write signal;

wherein the method comprises the following steps:

encoding a first value to the write signal, using the write signal to map the first value to a state of the modulating element;

encoding a second value to a read signal;

producing an output signal intensity as the transmitted or reflected read signal, wherein the product of the first value and the second value is encoded in the output signal intensity;

wherein the write signal is an electrical signal;

wherein the waveguide is doped and the electrical signal is applied to the doped waveguide, or wherein the electrical signal is applied to a resistive element proximate the modulating element; and wherein the electrical signal causes a current to flow through the waveguide or resistive element resulting in Joule heating and transfer of heat energy from the waveguide or resistive element to the modulating element, thereby adjusting the state of the modulating element.

17. A device for performing a multiplication operation in the optical domain comprising:

an optical waveguide;

a modulating element that is optically coupled to the optical waveguide, the modulating element modifying a transmission, reflection or absorption characteristic of the waveguide dependant on its state, wherein the state of the modulating element is adjustable by a write signal;

a light source configured to transmit optical signals through the optical waveguide;

a detector configured to detect an intensity of light from the waveguide;

a controller, configured to:

encode a first value to the write signal, encode a second scalar value to a read signal transmitted by the light source;

determine an output pulse intensity based on a signal from the detector;

determine the result of multiplication of the first and second values based on the output pulse intensity;

and apply a transmission offset correction to the output pulse intensity by subtracting a transmission baseline from the output pulse intensity.

18. The device of claim 17, wherein the state of the modulating element is adjustable by an optical signal carried by the waveguide and the controller is configured to encode a first value to a write signal transmitted by the light source.

19. The device of claim 17, further comprising an electrical signal generator, wherein the state of the modulating element is adjustable by an electrical signal generated by the electrical signal generator, the electrical signal being said write signal.

20. The device according to claim 19, wherein the waveguide is doped and the electrical signal is arranged to be applied to the waveguide, or further comprising a resistive element proximate the modulating element, wherein the electrical signal is arranged to be applied to a resistive element, and/or wherein the controller is configured to encode a first value to the electrical signal produced by the electrical signal generator, and/or wherein the electrical signal is arranged to cause a current to flow through the waveguide or the resistive element resulting in Joule heating and transfer of heat energy from the waveguide or resistive element to the modulating element, thereby adjusting the state of the modulating element.

* * * * *